United States Patent
Turner et al.

(10) Patent No.: US 10,738,817 B2
(45) Date of Patent: Aug. 11, 2020

(54) SELF-INDICATING DIRECT TENSION INDICATOR

(71) Applicant: TurnaSure LLC, Langhorne, PA (US)

(72) Inventors: F. Jonathan M. Turner, Philadelphia, PA (US); David L. Sharp, Warrington, PA (US)

(73) Assignee: TurnaSure LLC, Langhorne, PA (US)

( * ) Notice: Subject to any disclaimer, the term of this patent is extended or adjusted under 35 U.S.C. 154(b) by 300 days.

(21) Appl. No.: 15/946,142

(22) Filed: Apr. 5, 2018

(65) Prior Publication Data

US 2018/0291945 A1 Oct. 11, 2018

Related U.S. Application Data

(60) Provisional application No. 62/484,017, filed on Apr. 11, 2017.

(51) Int. Cl.
*F16B 31/02* (2006.01)

(52) U.S. Cl.
CPC ............ *F16B 31/028* (2013.01); *F16B 31/02* (2013.01)

(58) Field of Classification Search
CPC ...... F16B 1/0071; F16B 31/02; F16B 31/028; F16B 33/004; F16B 43/001
USPC .......................... 411/8, 10, 11, 531, 541–542
See application file for complete search history.

(56) References Cited

U.S. PATENT DOCUMENTS

| | | |
|---|---|---|
| 2,531,048 A | 11/1950 | Huck |
| 2,928,302 A | 3/1960 | Owen et al. |
| 3,057,246 A | 10/1962 | Brilmyer |

(Continued)

FOREIGN PATENT DOCUMENTS

| | | |
|---|---|---|
| DE | 10302707 | 9/2003 |
| DE | 202007013473 | 12/2007 |

(Continued)

OTHER PUBLICATIONS

"Technical Data Sheet, High Strength Squirter® Assemblies—HSSA" by Cooper & Turner Limited, Construction, Railway and General Engineering Fastenings, from www.cooperandturner.co.uk, 4 pgs, May 2003.

(Continued)

*Primary Examiner* — Roberta S Delisle
(74) *Attorney, Agent, or Firm* — Stradley Ronon Stevens & Young, LLP

(57) ABSTRACT

A direct tension indicating (DTI) washer. The DTI washer has an annular body and one or more U-shaped horseshoe protuberances. The annular body includes a central hole, a circumference, an outer edge, a first face, and a second face opposite from the first face. The horseshoe protuberances each have a height, an apex closest to the central hole, and an opening directed toward the outer edge. The horseshoe protuberances are integral with the annular body and struck and partially sheared from the annular body to project from the first face of the annular body and leave one or more corresponding indentations in the second face of the annular body. The horseshoe protuberances may be radially offset from their corresponding indentations. An indicating material is initially encapsulated and contained within the area on the first face defined by each of the horseshoe protuberances.

20 Claims, 12 Drawing Sheets

(56) References Cited

U.S. PATENT DOCUMENTS

| | | | |
|---|---|---|---|
| 3,187,621 A * | 6/1965 | Turner | F16B 31/028 |
| | | | 411/10 |
| 3,285,120 A | 11/1966 | Kartiala | |
| 3,318,390 A | 5/1967 | Hoza et al. | |
| 3,476,009 A | 11/1969 | Markey | |
| 3,534,651 A | 10/1970 | Belfiglio | |
| 3,915,053 A | 10/1975 | Ruhl | |
| 4,020,734 A | 5/1977 | Bell | |
| 4,103,725 A | 8/1978 | Abe | |
| 4,302,136 A | 11/1981 | Abe | |
| 4,303,001 A | 12/1981 | Trungold | |
| 4,431,353 A | 2/1984 | Capuano | |
| 4,503,736 A | 3/1985 | Fushiya et al. | |
| 4,571,133 A | 2/1986 | Lindow | |
| 4,637,764 A | 1/1987 | Imai | |
| 4,659,267 A | 4/1987 | Uno et al. | |
| 4,836,063 A | 6/1989 | Fushiya | |
| 4,845,998 A | 7/1989 | DeMartelaere et al. | |
| 4,887,948 A | 12/1989 | Calmettes | |
| 4,889,457 A | 12/1989 | Hageman | |
| 4,943,196 A | 7/1990 | Dahl | |
| 4,987,669 A | 1/1991 | Makimae et al. | |
| 5,015,132 A | 5/1991 | Turner et al. | |
| 5,049,016 A | 9/1991 | Nordyke | |
| 5,108,238 A | 4/1992 | Ewing | |
| 5,370,483 A | 12/1994 | Hood et al. | |
| 5,487,632 A | 1/1996 | Hood et al. | |
| 5,490,439 A | 2/1996 | Matsumura et al. | |
| 5,562,379 A | 10/1996 | Rausch et al. | |
| 5,582,079 A | 12/1996 | Matsumura et al. | |
| 5,667,346 A | 9/1997 | Sharp | |
| 5,769,581 A | 6/1998 | Wallace et al. | |
| 5,913,647 A | 6/1999 | Hodge | |
| 5,931,618 A | 8/1999 | Wallace et al. | |
| 5,953,965 A | 9/1999 | Kaneyama et al. | |
| 6,135,687 A | 10/2000 | Leek et al. | |
| 6,152,665 A | 11/2000 | Wallace et al. | |
| 6,204,771 B1 | 3/2001 | Ceney | |
| 6,425,718 B1 | 7/2002 | Herr et al. | |
| 6,487,940 B2 | 12/2002 | Hart et al. | |
| 6,729,819 B2 | 5/2004 | Wallace | |
| 7,014,404 B2 | 3/2006 | Chiang | |
| 7,204,667 B2 | 4/2007 | Uno et al. | |
| 7,398,700 B2 | 7/2008 | Makimae et al. | |
| 7,635,243 B2 | 12/2009 | Turner et al. | |
| 7,857,562 B2 | 12/2010 | Wallace | |
| 8,002,641 B2 | 8/2011 | Wallace | |
| 8,197,167 B2 | 6/2012 | Turner et al. | |
| 8,382,409 B2 | 2/2013 | Wallace | |
| 8,591,157 B1 | 11/2013 | Stewart et al. | |
| 8,696,275 B2 | 4/2014 | Wallace et al. | |
| 8,991,266 B2 | 3/2015 | Hsieh | |
| 9,435,368 B2 * | 9/2016 | Stewart | F16B 43/00 |
| 9,863,457 B2 | 1/2018 | Turner et al. | |
| 2002/0076296 A1 | 6/2002 | Dunfee | |
| 2003/0033780 A1* | 2/2003 | Hasan | E04D 5/14 |
| | | | 52/410 |
| 2005/0061119 A1 | 3/2005 | Becker | |
| 2005/0193869 A1 | 9/2005 | Ohtake et al. | |
| 2007/0144270 A1 | 6/2007 | Crass et al. | |
| 2008/0038076 A1 | 2/2008 | Turner | |
| 2008/0138167 A1 | 6/2008 | Wallace | |
| 2008/0251268 A1 | 10/2008 | Kushida | |
| 2009/0114067 A1 | 5/2009 | Berg et al. | |
| 2010/0199782 A1 | 8/2010 | Hsieh | |
| 2010/0251661 A1 | 10/2010 | Illgner et al. | |
| 2011/0036206 A1 | 2/2011 | Yang | |
| 2011/0048182 A1 | 3/2011 | Goss et al. | |
| 2011/0132157 A1 | 6/2011 | Duvan et al. | |
| 2011/0162493 A1 | 7/2011 | Anjanappa et al. | |
| 2011/0271798 A1 | 11/2011 | Wagner et al. | |
| 2013/0170924 A1* | 7/2013 | Wallace | F16B 31/028 |
| | | | 411/531 |
| 2013/0302106 A1 | 11/2013 | Appl et al. | |
| 2014/0048299 A1 | 2/2014 | Larson | |
| 2015/0204368 A1* | 7/2015 | Stewart | F16B 43/00 |
| | | | 411/10 |

FOREIGN PATENT DOCUMENTS

| | | |
|---|---|---|
| DE | 102006044774 | 4/2008 |
| EP | 0100555 | 2/1984 |
| EP | 0315501 | 5/1989 |
| EP | 3168485 | 5/2017 |
| FR | 2955366 | 7/2011 |
| GB | 750892 | 6/1956 |
| GB | 750894 | 6/1956 |
| GB | 834787 | 5/1960 |
| GB | 2263745 | 8/1993 |
| WO | 94/01689 | 1/1994 |
| WO | 2008/149386 | 12/2008 |
| WO | 2013/169639 | 11/2013 |

OTHER PUBLICATIONS

HSSA, High Strength Squirter Assemblies (8 pages) printed from website of Cooper & Turner Limited (www.cooperandturner.co.uk), Construction, Railway and General Engineering Fastenings; Oct. 2002 and May 2003.

European Search Report for European Application No. EP 16198081 issued by the European Patent Office dated Mar. 8, 2017.

"Orange is Good!;" Applied Bolting Technology; from http://www.appliedbolting.com; 2 pgs.

* cited by examiner

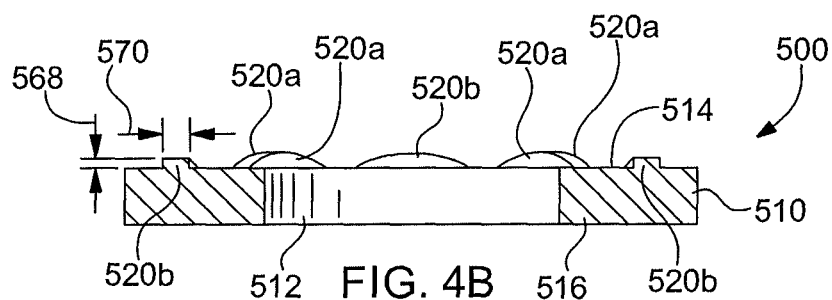
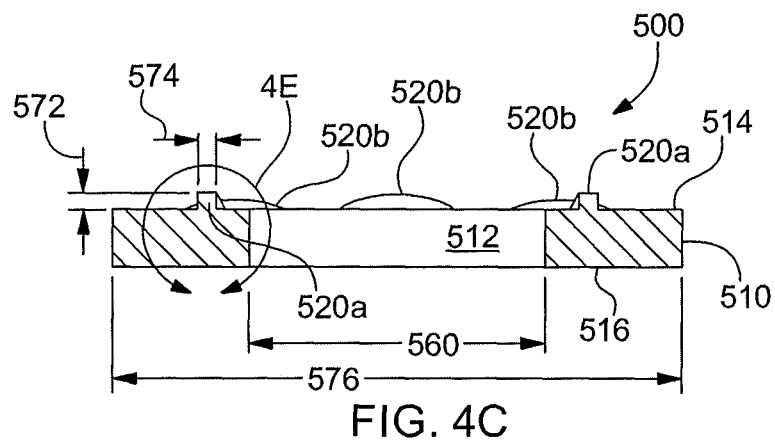
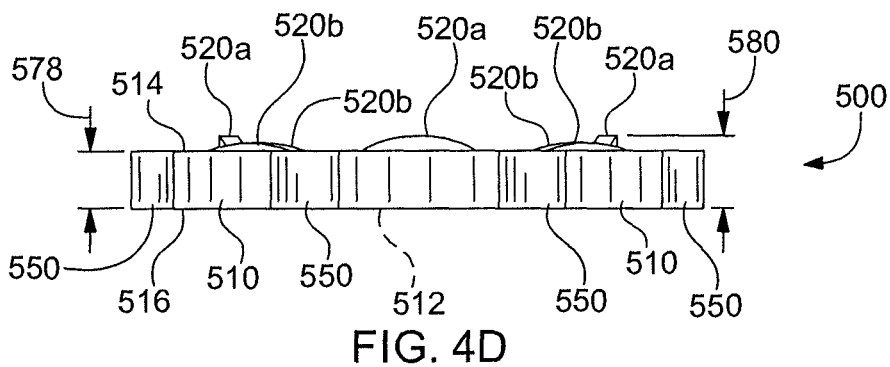
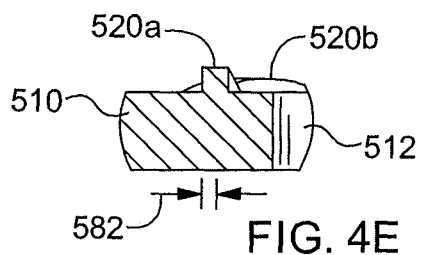

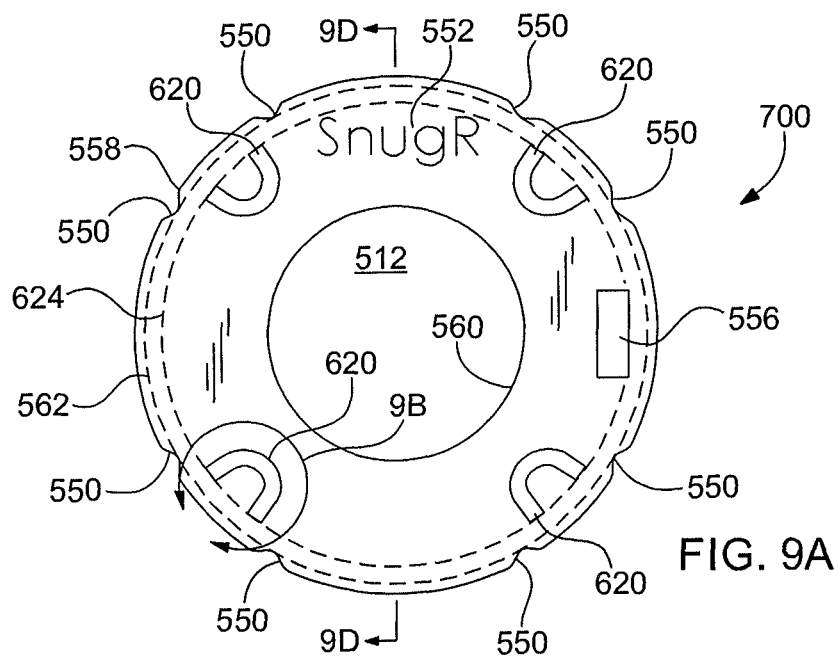
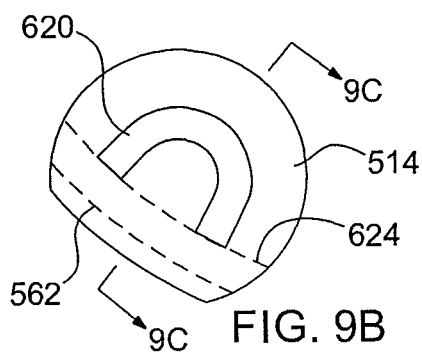
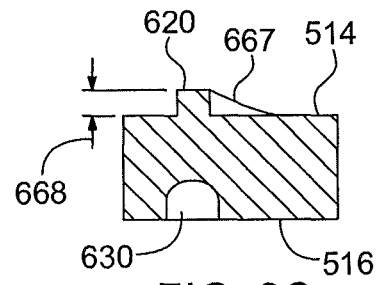
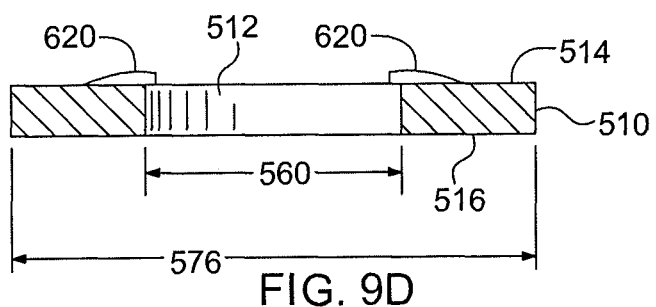
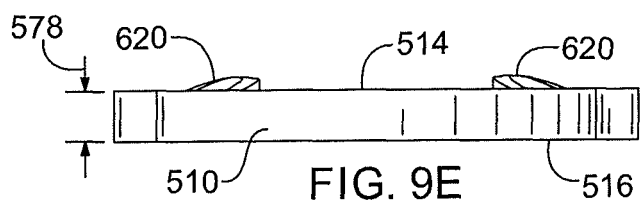

SELF-INDICATING DIRECT TENSION INDICATOR

RELATED APPLICATION

This application claims the benefit of priority to U.S. Provisional Patent Application Ser. No. 62/484,017, filed on Apr. 11, 2017, the contents of which are incorporated in this application by reference.

TECHNICAL FIELD

The present invention relates generally to direct tension indicating washers, and particularly to direct tension indicating washers having one or more pairs of indentations and protuberances useful in commercial installations such as utility structures, steel bridges, rail, conveyance, heavy equipment, heavy industrial, construction, agricultural, and general structural steel fastening applications.

BACKGROUND

In the construction of steel structures, such as bridges and buildings, it is common to join together two or more joint members (e.g., a beam to a column) by forming apertures in each of the joint members, forming matching apertures in splice plates spanning between the joint members, inserting bolts through the apertures, and securing the bolts on the opposite side of the joint members with nuts. Installation requirements of fasteners for these structural applications are detailed in a number of standards: Original Equipment Manufacturing standards, Department of Transportation construction standards, and other well-known industry standards such as those published by the Research Council on Structural Connections (RCSC). Other similar standards from different consensus bodies also exist in different markets.

The industry uses a number of different fasteners, including (1) hex-head and flange head fasteners; (2) pin- and collar fasteners; (3) and twist-off type fasteners. Each of these fasteners is summarized below. It is further known in the art to use a direct tension indicating (DTI) washer, also referred to as a load indicating washer or fastener, to control the tightening of a fastened joint by developing an indication of the tension in the fastener. It is still further known to include an indicating material, such as an extrudable silicone, with the DTI washer to provide a clear visual indication that a predetermined tension has been achieved in the fastener.

Hex-head fasteners can be installed using conventional air (pneumatic) impact wrenches and other wrenches including hand operated, electrically operated, and hydraulic wrenches. These fasteners are typically installed using either torque-based, compression-based, or degree-based installation techniques. Hex-head fasteners may have complicated washer usage requirements, depending on hole geometry, connection materials, and installation method. Installation of any hex-head fastener may require at least two installers to ensure proper nut rotation relative to the bolt. In some installations, the bolt may shift or "roll" in the hole during installation. For this reason many installation specifications require match marking of bolts and nuts. This operation is often inaccurate, subject to operator or inspector knowledge, and can even be replicated after installation on fasteners which have not been tensioned.

Pin-and-collar fasteners (also known as lock-pin collar systems) operate on a principle of direct tension. Examples of pin-and-collar fasteners can be found at least in U.S. Pat. Nos. 2,531,048; 3,057,246; 3,915,053; 4,943,196; 5,049,016; and 5,562,379. Pin-and-collar fasteners have a pin with a first portion including a first plurality of annular rings (as opposed to the helical threads on the bolt of the twist-off fastener), a second portion with a second plurality of annular rings, and a neck portion between the first portion and the second portion. The first portion of the pin is connected to a head of the fastener, and the second portion of the pin defines an end of the fastener. A collar is disposed about the pin for engagement with the first portion. The collar is deformed with cold working about the pin and the first plurality of annular rings. The pin breaks off at the neck portion when the tensile capacity of the neck portion is exceeded. These fasteners are not removable and the tooling required to install these fasteners is expensive and cumbersome. Although these fasteners have a demonstrated capability to fracture in the neck, providing high assurance of direct tensile loads, they have a problem with properly snugging connections, particularly those involving large plies. At a certain point of deformation into the annular rings, the tensile loads begin to be applied against the rings on the pin, not directly to the head bearing surface on the opposite side of the connection. These fasteners are not able to perform efficient, sequential snugging operations.

Twist-off fasteners rely on torque-based installation. Examples of twist-off fasteners and related tooling are described in the industry standard specifications ASTM F1852 and F2280, and JSS S10T, and at least in GB 834787 A and in U.S. Pat. No. 2,928,302; 4,637,764; 4,659,267; 4,836,063; and 5,108,238. These fasteners are known by various other names, including TC bolts, Tru-Tension bolts, Tension Control bolts, Torque Control bolts, Tor-Shear bolts, and LeJeune bolts, among others. Twist-off fasteners have a bolt with a threaded shank and a nut in threaded engagement with the threaded shank. The bolt further has a head at one end of the shank and a splined end at the other end of the shank. Importantly, there is a shear groove between the splined end and the threaded shank, causing a stress concentration in that area. A manual wrench or power wrench, which has an inner socket engaged with the splined portion and an outer socket engaged with an outer surface of the nut, applies a torsional force on the bolt and nut. When the torsional load on the nut exceeds the shear capacity of the shear groove, the splined end is removed from the end of the bolt. In such fastener assemblies, the fastener tensions are related to calculated coefficients of friction, not the actual tensile or clamp load. Therefore, this fastening system is highly dependent on frictional engagement, and the effectiveness of the fastener (in other words, the ability of the fastener to achieve and maintain a desired clamp load) can vary with temperature, lubrication, weathering, and other environmental factors.

Regardless of the type of fastener used, a DTI washer can be combined with the fastener to control the tightening of a fastened joint by developing an indication of the tension in the fastener. Using DTI washers to measure tension in the fastener is preferable to measuring tension based on torque control because torque control measurements can result in wide variations in the tension in the fastener. Variations in the tension may result from factors such as variations in fastener lubricity, burrs on the thread of threaded fasteners, variations in the friction at the bearing surface between the joint member and the threaded fastener, dirt or corrosion on the threads, temperature, and the like.

A typical DTI washer includes a plurality of protuberances which are struck and partially sheared from an annular body to leave indentations in the annular body. For example, as depicted in FIGS. 1A, 1B, and 1C, a prior art DTI washer 10 includes an annular body 20 surrounding a central hole 22. FIG. 1A depicts a top view of the prior art DTI washer 10, FIG. 1B depicts a bottom view of the prior art DTI washer 10, and FIG. 1C depicts a cross-sectional view of the prior art DTI washer 10 along line 1C-1C of FIG. 1A. A first face 24 of the annular body 20 includes a plurality of protuberances 30 surrounding the central hole 22 along a concentric circle 32. A second face 26 of the annular body 20 includes a plurality of indentations 40. The area of the annular body 20 between the plurality of indentations 40 and the central hole 22 is referred to as the web 50. DTI washers of this type are disclosed in U.S. Pat. No. 5,015,132. Although many variations of these washers are known (for example, U.S. Pat. No. 5,667,346 discloses DTI washers having curved protuberances), prior art DTI washers share a common feature of the protuberances 30 being aligned with and centered over the indentations 40.

Referring to FIGS. 2A and 2B, the prior art DTI washer 10 may be used to join two or more joint members 110 in an exemplary joint assembly 100. As depicted in FIG. 2A, the prior art DTI washer 10 is placed on a first side of the joint members 110. An externally threaded member, such as a bolt 120 having a head 122 and a threaded shank 124, is then inserted through the joint members 110 and the central hole 22 of the prior art DTI washer 10 so that a bearing surface 126 of the bolt 120 contacts the protuberances 30 of the prior art DTI washer 10. Next, an internally threaded member, such as a nut 130, is attached to the shank 124 of the bolt 120 on a second side of the joint members 110 opposite the head 122 of the bolt 120. In some cases, a washer 140 may be positioned between the second side of the joint members 110 and the nut 130 to isolate the turning of the nut 130 from the joint members 110.

As depicted in FIG. 2B, as the nut 130 is rotated and tightened onto the threaded shank 124 of the bolt 120, the protuberances 30 are forced into the indentations 40. Tightening is stopped once the gap between the head 122 of the bolt 120 and the prior art DTI washer 10 disappears or is reduced to a desired distance which indicates the desired amount of tension in the threaded shank 124. The dimensions and material properties of the prior art DTI washer 10 determine how much tension is required to force the protuberances 30 back into the indentations 40. The indentations 40 may be at least partially filled as a result of the protuberances 30 being forced back into the annular body 20, and perform no useful function in the operation of the prior art DTI washer 10. Rather, the indentations 40 are a result of the displacement of material during the forming operation which creates the protuberances 30.

Regardless of the embodiment, the DTI washer may include an indicating material to provide a clear visual indication that a predetermined tension has been achieved in the fastener. U.S. Pat. No. 5,931,618 titled "Direct Tension Indicating Washers" describes such a material, and the DTI washer with the material is sold commercially under the registered trademark Squirter®. The DTI washer has a first surface with at least one protuberance formed on that first surface and a second surface with at least one indentation formed on the second surface opposite the protuberance. The inner diameter of the DTI washer has an inner diameter wall meeting the second surface at an inner diameter edge. The outer diameter has an outer diameter wall meeting the second surface at an outer diameter edge. The inner diameter edge and the outer diameter edge lie in different planes. This difference causes the flattened DTI washer to exert force against a bolt and maintain bolt tension. The DTI washer includes indicating material positioned in the indentation and a channel formed in the second surface leading from the indentation to the outside diameter of the DTI washer.

U.S. Pat. No. 6,425,718 titled "Direct Multi-Tension Indicating Washer Having Bumps of a First and Second Height" discloses an alternative to the DTI washer disclosed in U.S. Pat. No. 5,931,618. The alternative DTI washer extrudes indicating material of varying colors depending on the compression force applied to it by providing a first and second surface having respective protuberances (i.e., bumps) and indentations. The compression force on the washer is equal to the tension of a bolt passing through the washer. The indentations in the second surface are filled with a solid extrudable colored material. By making at least a first protuberance taller than at least a second protuberance, the first protuberance will compress before the second protuberance, causing it to extrude the color material in its corresponding indentation before the second protuberance does the same as the tension in the bolt is increased. By making the material under the first protuberance a different color than the material under the second protuberance, an operator can determine which of two desired tensions the bolt has reached. In use, an operator merely tightens the bolt passing through the washer or a nut threaded to the bolt until the bolt reaches a first desired tension as indicated by the extruded material of the first color, such as green. An intervening step is performed at the first bolt tension, if required. Then the operator continues to tighten the bolt or nut until the bolt reaches a second desired tension as indicated by the extruded material of the second color, such as red.

Each of the existing different fasteners and DTI washers has shortcomings. When twist-off type tension control bolts are fully tightened, for example, their tips shear off to give an indication that final full preload has been achieved. Thus, if only snug tightening is required, the load is presumed adequate. These types of bolts do not offer any indication of snug before final full tensioning. Fastener systems that use Squirter®-type DTI washers also do not provide a visual indication of snug. Further, these systems do not have a distinct two-stage flattening of the protuberances that allows a check for both snug and final full tightening. In fact, there is no known prior art system that includes a load-indicating function for both the snug stage and the final tightening stage.

There is also no known DTI washer with protuberances of different heights to perform different functions, or unique shapes to encapsulate an elastomeric material to be emitted at the right time indicating a properly snugged or fully tightened bolt. Prior art bolting practices, such as use of a calibrated wrench or turn-of-nut, require continuous inspection of tightening operations so that an operator can verify that an initial tightening operation is being performed. This inspection is an on-going activity, as there is no evidence following the snugging that the work has been performed. The inspection is a verification or confirmation that performance of this work is being observed.

To overcome the shortcomings of existing DTI washers, an object is to provide an improved DTI washer. Another object is to enable a DTI washer to perform two or more discreet load measurements accurately. A related object is to enable a DTI washer to perform two or more different operations as a function of the plastic deformation of the protuberances.

It is still another object to use uniquely shaped and varying height protuberances to enable a visual indication that the fastener assembly is adequately tightened. A related object is to overcome the limitations of the existing DTI washers, especially those marketed as Squirter® DTI washers, which suffer from the elastomeric indicating material giving premature visual indications that a bolt is adequately tightened. Another related object is to overcome geometric limitations of standard DTI washers by introducing protuberance shapes that protect the elastomeric indicating material during handling, packaging, shipping, and warehousing so that the elastomeric material can visually indicate when adequate bolt tension has been achieved.

An additional object is to delay, through geometric function, the emission of an elastomeric material until the fastener assembly is adequately tightened. Yet another object is to capture the elastomeric material so that during use it is against a relatively smooth surface (e.g., a washer or bolt) that ensures predictable and repeatable accurate results. (Contrast such a configuration with prior art squirt-type devices, for which the elastomeric material is placed against the unpredictable surface of structural steel which may vary from very smooth to rough.) It is still a further object to provide visual proof that the "snug" tight condition has been achieved for a fastener and that the fastener is in firm contact with a component to be joined.

SUMMARY

To achieve these and other objects, and in view of its purposes, an improved DTI washer is provided. According to one embodiment, the DTI washer has an annular body and one or more U-shaped horseshoe protuberances. The annular body includes a central hole, a circumference, an outer edge, a first face, and a second face opposite from the first face. The horseshoe protuberances each have a height, an apex closest to the central hole, and an opening directed toward the outer edge. The horseshoe protuberances are integral with the annular body and struck and partially sheared from the annular body to project from the first face of the annular body and leave one or more corresponding indentations in the second face of the annular body. The horseshoe protuberances may be radially offset from their corresponding indentations. An indicating material is initially encapsulated and contained within the area on the first face defined by each of the horseshoe protuberances. According to another embodiment, the DTI washer has one or more additional protuberances having a height greater than the height of the horseshoe protuberances.

According to a further embodiment, a joint assembly is provided including at least one joint member, a DTI washer disposed adjacent to the at least one joint member, a first bearing member on a first side of the at least one joint member, and a second bearing member on a second side of the at least one joint member. The DTI washer has an annular body and one or more U-shaped horseshoe protuberances. The annular body includes a central hole, a circumference, an outer edge, a first face, and a second face opposite from the first face. The horseshoe protuberances each have a height, an apex closest to the central hole, and an opening directed toward the outer edge. The horseshoe protuberances are integral with the annular body and struck and partially sheared from the annular body to project from the first face of the annular body and leave one or more corresponding indentations in the second face of the annular body. The horseshoe protuberances may be radially offset from their corresponding indentations. An indicating material is initially encapsulated and contained within the area on the first face defined by each of the horseshoe protuberances. The first and second bearing members are attached to or loosely disposed around a shaft positioned in an aperture of the at least one joint member and the central hole of the annular body, such that the first bearing member has a bearing surface in contact with the one or more horseshoe protuberances of the DTI washer and the second bearing member has a bearing surface in contact with the second side of the at least one joint member.

According to still another embodiment, a DTI washer includes an annular body, a set of first protuberances, and a set of second protuberances. The annular body includes a central hole, a circumference, a first face, and a second face opposite from the first face. The first protuberances each have a first height and are integral with the annular body and struck and partially sheared from the annular body to project from the first face of the annular body and leave one or more corresponding first indentations in the second face of the annular body. The second protuberances each have a second height smaller than the first height and are integral with the annular body and struck and partially sheared from the annular body to project from the first face of the annular body and leave one or more corresponding second indentations in the second face of the annular body. At least one of the first protuberances or the second protuberances are radially offset from their corresponding indentations.

According to further embodiment, a joint assembly is provided including at least one joint member, a DTI washer disposed adjacent to the at least one joint member, a first bearing member on a first side of the at least one joint member, and a second bearing member on a second side of the at least one joint member. The DTI washer has an annular body, a set of first protuberances, and a set of second protuberances. The annular body includes a central hole, a circumference, a first face, and a second face opposite from the first face. The first protuberances each have a first height and are integral with the annular body and struck and partially sheared from the annular body to project from the first face of the annular body and leave one or more corresponding first indentations in the second face of the annular body. The second protuberances each have a second height smaller than the first height and are integral with the annular body and struck and partially sheared from the annular body to project from the first face of the annular body and leave one or more corresponding second indentations in the second face of the annular body. At least one of the first protuberances or the second protuberances are radially offset from their corresponding indentations. The first and second bearing members are attached to or loosely disposed around a shaft positioned in an aperture of the at least one joint member and the central hole of the annular body, such that the first bearing member has a bearing surface in contact with at least the first protuberances of the DTI washer and the second bearing member has a bearing surface in contact with the second side of the at least one joint member.

It is to be understood that both the foregoing general description and the following detailed description are exemplary, but are not restrictive, of the invention.

BRIEF DESCRIPTION OF DRAWING

The invention is best understood from the following detailed description when read in conjunction with the accompanying drawing. It is emphasized that, according to common practice, the various features of the drawing are not to scale. On the contrary, the various features are arbitrarily expanded or reduced for clarity. Included in the drawing are the following figures:

FIG. 4B is a cross-sectional view of the DTI washer taken along the line 4B-4B of FIG. 4A;

FIG. 4C is a cross-sectional view of the DTI washer taken along the line 4C-4C of FIG. 4A;

FIG. 4D is an edge view of the DTI washer shown in FIG. 4A;

FIG. 4E is a detail view highlighted by the circle 4E of FIG. 4C;

FIG. 9A is a top view of another alternative embodiment of a DTI washer with only one set of protuberances, namely horseshoe-shaped protuberances;

FIG. 9B is a detail view highlighted by the circle 9B of FIG. 9A;

FIG. 9C is a cross-sectional view of the horseshoe protuberance of the DTI washer taken along the line 9C-9C of FIG. 9B;

FIG. 9D is a cross-sectional view of the DTI washer taken along the line 9D-9D of FIG. 9A;

FIG. 9E is an edge view of the DTI washer shown in FIG. 9A;

DETAILED DESCRIPTION

Figure 1A:
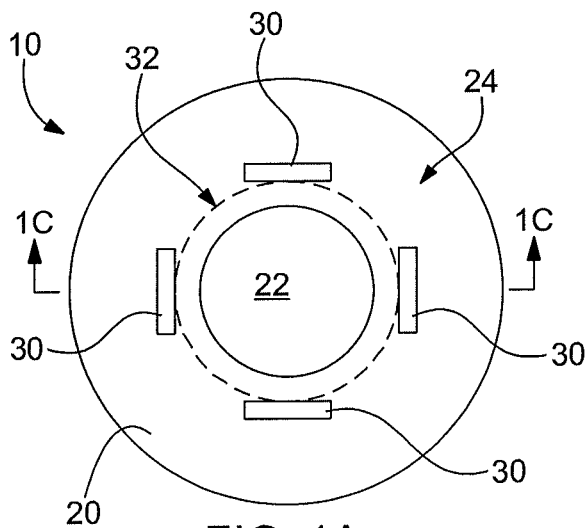
FIG. 1A is a top view of a prior art direct tension indicating (DTI) washer.
Figure 1B:
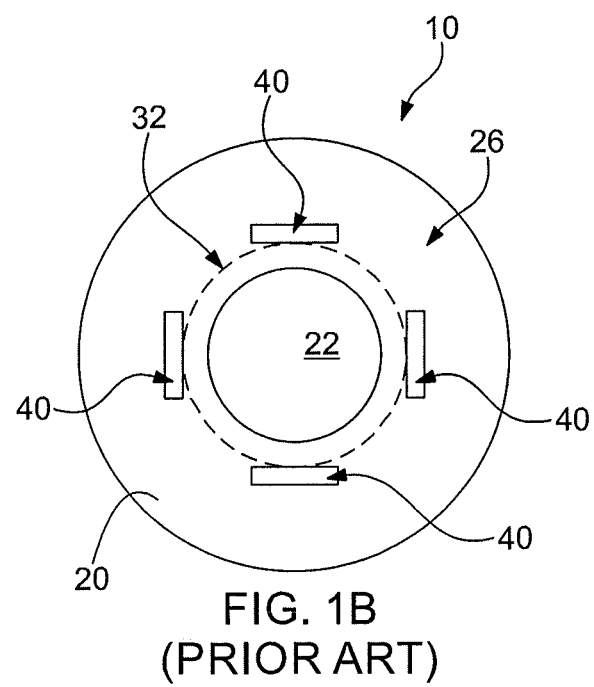
FIG. 1B is a bottom view of the prior art DTI washer of FIG. 1A.
Figure 1C:
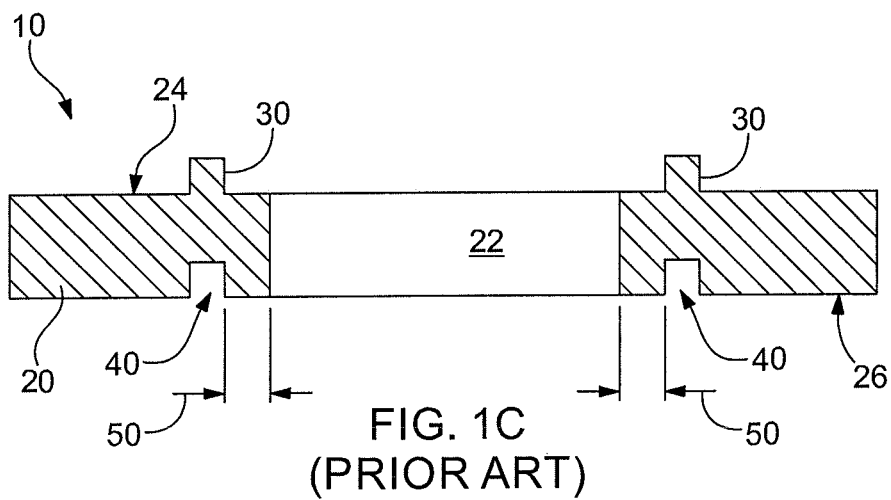
FIG. 1C is a cross-sectional view of the prior art DTI washer of FIG. 1A.

Common industry problems among a number of connection types are related to the establishment of two important installation criteria. These two criteria are snug tensioning and final tensioning (often referred to as clamp load). The proper snug tensioning of a given connection, before full tensioning, will ensure that all connected plies are in firm and continuous contact, and where application of additional torque or tension to adjacent fasteners will not decrease tension in fasteners already installed. The Research Council on Structural Connections ("RCSC"), in Section 8.1 of its Specification for Structural Joints Using High-Strength Bolts (Aug. 1, 2014), defined "snug tight" as "the condition that exists when all of the plies in a connection have been pulled into firm contact by the bolts in the joint and all of the bolts in the joint have been tightened sufficiently to prevent removal of the nuts without the use of a wrench."

Snug tension should be sufficient to bring plies into continuous contact, or as near continuous contact as possible, but is preferably done below the yield strength of the fastener. In connections that require full tensioning, final installation tension can be achieved via a number of methods. Without good control of the snugging operation many fasteners are over tensioned or in some cases connection plies are not brought into firm and continuous contact. In many cases, lubricants are so effective and so little testing is performed on field matched assemblies, that snug tension mistakenly exceeds required final installation tension. Application of further rotation to already highly tensioned fasteners increases the risk of critical failures from fasteners stressed beyond ultimate tensile strength. Severe bolt necking and cracking can result.

Final installation tension is the tension which exceeds minimum design tension to meet the requirement of a particular application, specification, or standard. In connections using fastening systems subject to final tensioning using torque there are a number of well-documented concerns regarding the repeatability and variability of torque-based installation methods, including variability in applied torque, changes in environmental conditions, passage of time, equipment repeatability, equipment maintenance, and a number of other potential issues. In connections using fastening systems subject to final tensioning using compression or angle, there are a number of well-documented concerns regarding the establishment of a proper snug condition.

Existing DTI washers and the focus of the entire fastener industry has been directed at ensuring that fasteners have been adequately tightened upon final installation. There has been no device that focuses on first ensuring that a fastened joint has been snugged, or compacted properly into firm contact, before final tightening. Yet, engineers acknowledge that the snug point is critical to any method of tightening groups of bolts to necessary high levels of tension. The RCSC, in its Specification for Structural Joints Using High-Strength Bolts (Aug. 1, 2014), stated: "With all methods, it is important to first install bolts in all holes of the joint and to compact the joint until the connected plies are in firm contact. Only after completion of this operation can the joint be reliably pretensioned."

Although the snugging step of bolt tightening is recognized as critical to achieving acceptable results after final tightening, there is no practical visual tool available to indicate achievement of a snug compact joint. Prior art fastener methods such as turn-of-nut, calibrated (torque) wrench, twist-off type bolts, and DTI washers do not give visual evidence or proof that the snug condition has been achieved before final tightening to minimum required preload. Further, a significant number of bolted joints do not need to be fully tightened, because snug tight is adequate for proper function. In these latter cases, there is no method to visually determine whether the snug condition has been achieved.

Until now there has been no practical way to visually discern whether snugging has been performed. Traditional DTI washers allow, upon close inspection, a visual cue that snugging has been performed when the protuberances show some initial, very incremental and small amount of deformation. Considerable force is required to achieve this small compression, on the order of 50% of the final minimum tension.

Adequate snug is achieved in almost every instance at a load considerably less than the load which causes protuberance deformation. Prior art DTI washers do not allow for greater (obvious) deformation at snug, however, because if they were manufactured to be weak enough to deform in an obvious change to their dimensions (flattening of the protuberance and reduction of the gap), they would be too weak to indicate attainment of the minimum specified preload before fully collapsing to a condition of no gap. Stated another way, if conventional DTI washers were made weak enough to provide a visual and obvious indication of snug, they would be too weak to indicate final tension. And final tension is the primary focus of engineers and contractors on joints that require preloading.

Figure 3:
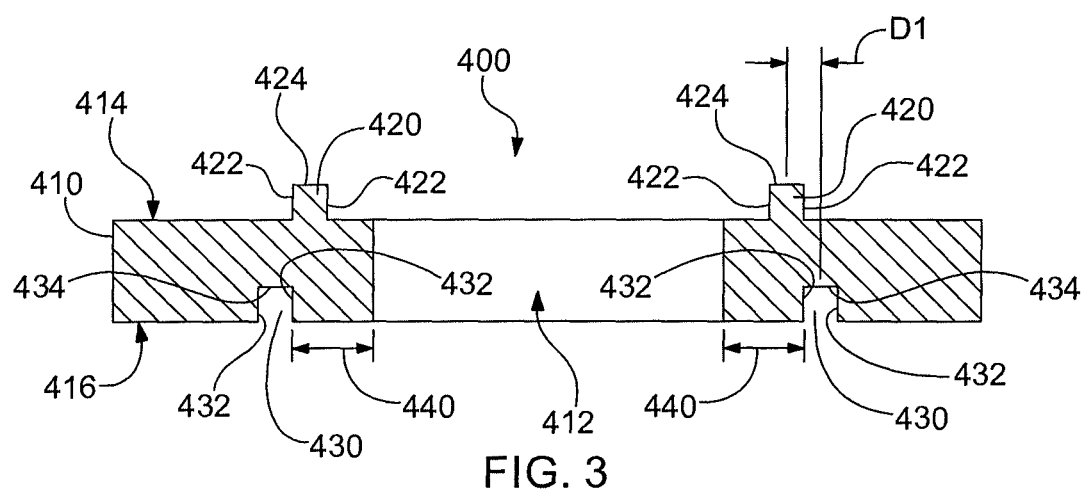
FIG. 3 is a cross-sectional view of a DTI washer having offset protuberances and indentations.

Referring now to the drawing, in which like reference numbers refer to like elements through the various figures that comprise the drawing, FIG. 3 is a cross sectional view of an exemplary embodiment of a direct tension indicating (DTI) washer 400 having radially offset protuberances and indentations. Offsetting the protuberances and indentations improves mechanical strength of the DTI washer 400, particularly when used around a bolt inserted into an enlarged aperture in one or more joint members. The DTI washer 400 includes an annular body 410 surrounding a central hole 412. The DTI washer 400 further includes a plurality of protuberances 420 integral with the annular body 410. The protuberances 420 are struck from and sheared from the annular body 410 to project from a first face 414 of the annular body 410 and leave a corresponding plurality of indentations 430 in a second face 416 of the annular body 410 opposite from the first face 414. By integral, it is meant that the annular body 410 and the protuberances 420 are made of a single piece or a single unitary part without additional pieces. Each protuberance 420 is defined by a pair of outer sidewalls 422 extending away from the first face 414 of the annular body 410 and an outer surface 424 extending between the pair of outer sidewalls 422 and between two spaced regions of the first face 414. Each indentation 430 is defined by a pair of inner sidewalls 432 extending partially through the annular body 410 from the second face 416, and from which the pair of the outer sidewalls 422 have been sheared, and an inner surface 434 extending between the pair of inner sidewalls 432 and between two spaced regions of the second face 416. The region of the annular body 410 between the indentations 430 and the central hole 412 is defined as the web 440.

In the embodiment depicted in FIG. 3, the protuberances 420 and indentations 430 may be rectangular and straight in outline, with outer sidewalls 422 and inner sidewalls 432 substantially tangential to circles concentric with the central hole 412 and substantially perpendicular to the first face 414 and the second face 416, respectively. Other embodiments may include protuberances 420 and indentations 430 having any suitable shape and size. Typically, the protuberances 420 and the indentations 430 are spaced at regular intervals around the central hole 412. There is no limit on the number of protuberances 420 and corresponding indentations 430 that may be included in the DTI washer 400.

As depicted in FIG. 3, the DTI washer 400 is further defined by the indentations 430 being offset from the protuberances 420 and being positioned farther away from the central hole 412. The amount of offset is defined by a distance D1 which is equal to the distance between a center line of a protuberance 420 and a center line of a corresponding indentation 430. The distance will vary with the overall size and thickness of the DTI washer 400, as well as the specific application for which it is intended. The "offset" DTI washer 400 is the subject of U.S. Pat. No. 9,863,457 owned by TurnaSure, LLC, the assignee of the subject patent application, and is incorporated in this document by reference in its entirety.

Preferably, the DTI washer 400 is manufactured by an offset extrusion process in which the punch which forms the indentations 430 is intentionally not aligned with the die which forms the protuberances 420. Use of such an offset extrusion process is traditionally undesirable because the off-center extruding causes unequal forces on the manufacturing equipment, which is associated with reduced tooling life, excessive tooling wear, and tooling failure. It has been discovered that offsetting the indentations 430 from the protuberances 420 improves the performance of the DTI washer 400 in at least three ways: (1) reducing the likelihood of unpredictable and undesirable deformation of the annular body 410, (2) changing the direction in which the protuberances 420 are compressed during tightening, and (3) preventing nesting.

Figure 4:
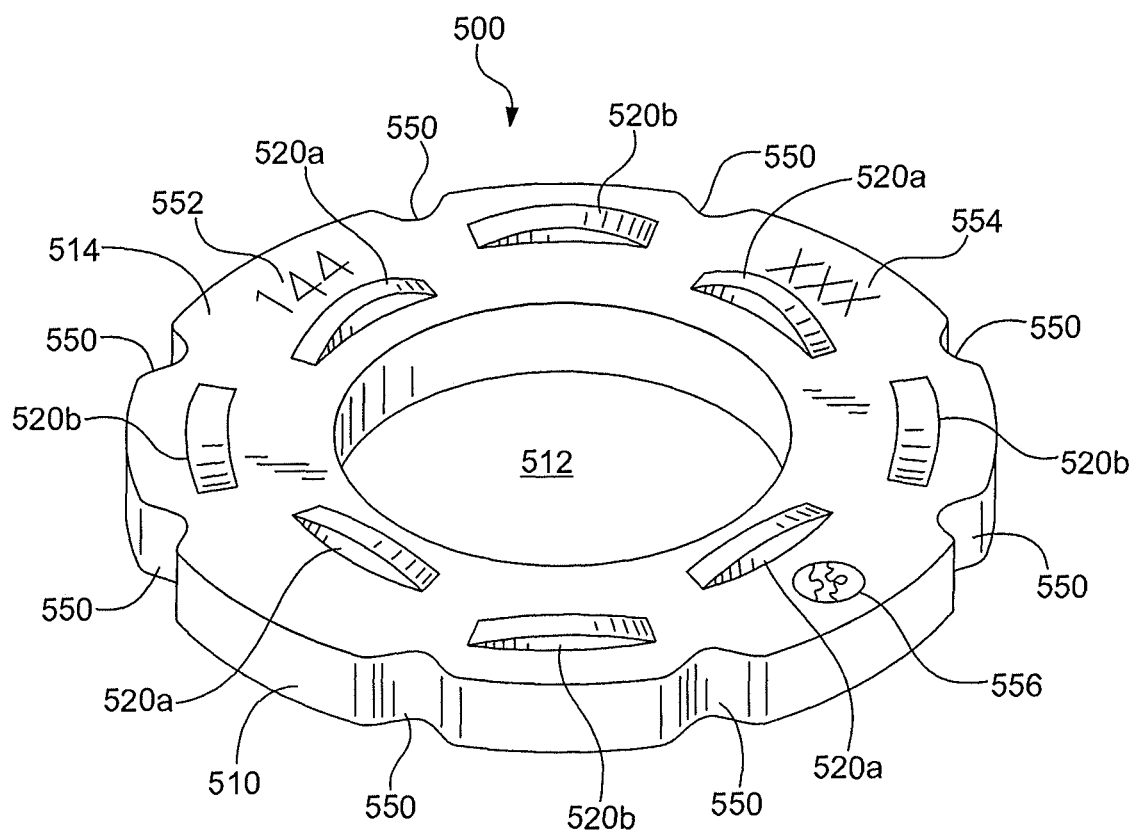
FIG. 4 illustrates, in a perspective view, the concept of a "two-stage" DTI washer with protuberances purposely set at more than one standard height.

FIG. 4 illustrates, in a perspective view, the concept of a "two-stage" DTI washer 500 with protuberances purposely set at more than one standard height. The two-stage DTI washer 500 has one ring of taller first protuberances 520a and a second ring of shorter second protuberances 520b. The first protuberances 520a flatten during the snugging or initial tightening operation and the second protuberances 520b flatten or crush when the minimum specified final bolt tension has been achieved. Thus, the first set of first protuberances 520a visually prove when snugging operations have been performed, and the second set of second protuberances 520b visually indicate that final tightening has been achieved. The DTI washer 500 may not include any elastomeric indicating material.

The indentations (not shown) corresponding to the first protuberances 520a and the second protuberances 520b could be sized and shaped according to any embodiment disclosed. For example, the indentations could be directly underneath their respective protuberances 520a and 520b, rectangular and straight in outline, The indentations could be offset from their respective protuberances 520*a* and 520*b*, or the indentations and protuberances 520*a* and 520*b* could be tapered.

The DTI washer 500 includes an annular body 510 surrounding a central hole 512. The protuberances 520*a* and 520*b* are integral with the annular body 510. The protuberances 520*a* and 520*b* are struck from and sheared from the annular body 510 to project from a first face 514 of the annular body 510 and leave a corresponding plurality of indentations in a second face 516 of the annular body 510 opposite from the first face 514. By integral, it is meant that the annular body 510 and the protuberances 520*a* and 520*b* are made of a single piece or a single unitary part without additional pieces.

The protuberances 520*a* and 520*b* (and their respective indentations) are spaced at regular intervals along respective imaginary circles around the central hole 512. Preferably, although not necessarily, the first set of first protuberances 520*a* are located closer to the central hole 512 and the second protuberances 520*b* are located farther from the central hole 512. There is no limit on the number of protuberances 520*a* and 520*b* (and corresponding indentations) that may be included in the DTI washer 500.

FIG. 4 also illustrates that the DTI washer 500 has a series of notches 550 formed around the circumference of the annular body 510. The notches 550 can be grouped in pairs around each of the second protuberances 520*b*, as illustrated; alternatively, the notches 550 might be located equidistant around the periphery of the DTI washer 500. The notches 550 function to distinguish the DTI washer 500 from conventional washers and to provide a location for an operator to place a tool such as a feeler gauge. Although eight notches 550 are shown in FIG. 4, any number of notches 550 suitable to achieve these functions could be provided.

The DTI washer 500 also may have, typically but not necessarily on its first face 514, a number of different indicia. For example, a first indicia 552 may indicate the type of the DTI washer 500, a second indicia 554 may indicate the lot number for the DTI washer 500, and a third indicia 556 may be the logo or other information indicating the source (i.e., manufacturer or distributor) of the DTI washer 500. Such indicia 552, 554, and 556 may be useful to the operator, among others.

Figure 4A:
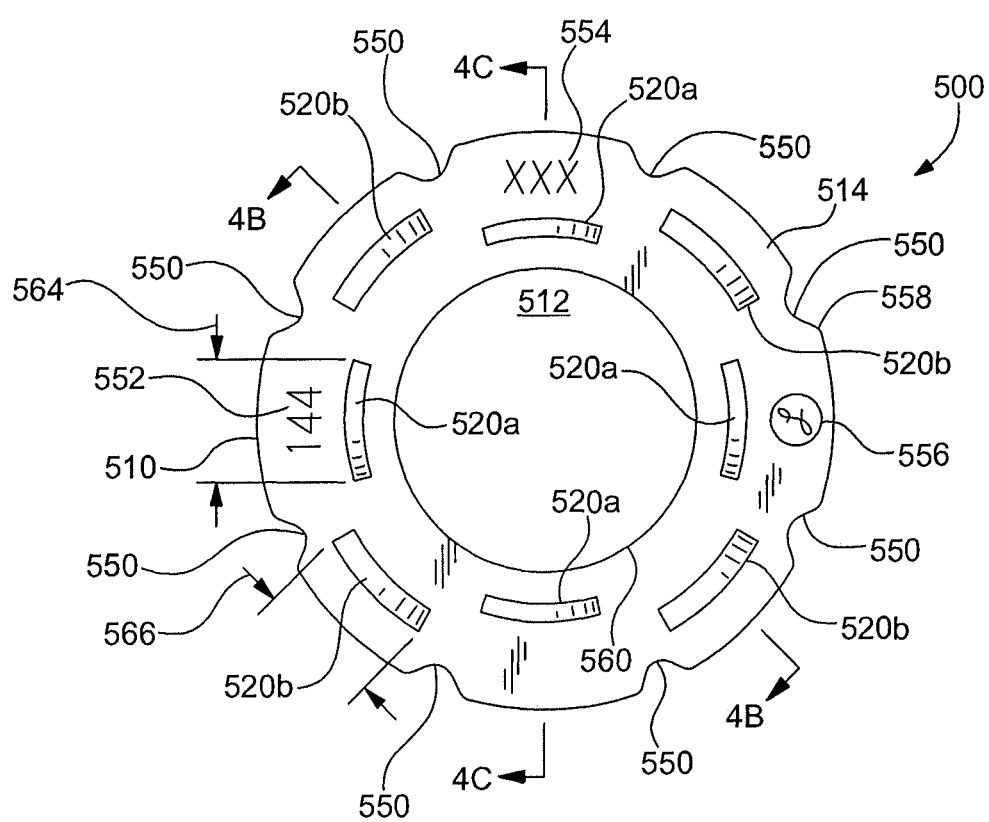
FIG. 4A is a top view of the DTI washer shown in FIG. 4.

FIG. 4A is a top view of the DTI washer 500 shown in FIG. 4. FIG. 4B is a cross-sectional view of the DTI washer 500 taken along the line 4B-4B of FIG. 4A. FIG. 4C is a cross-sectional view of the DTI washer 500 taken along the line 4C-4C of FIG. 4A. FIG. 4D is an edge view of the DTI washer 500 shown in FIG. 4A. And FIG. 4E is the detail view highlighted by the circle 4E of FIG. 4C.

The following example dimensions are included to more clearly demonstrate the overall nature of the DTI washer 500. These example dimensions are exemplary, not restrictive, of the DTI washer 500. Referring to FIG. 4A, for a ⅞ inch (2.22 cm) DTI washer 500 of type 144 ksi, the inner diameter 560 is about 0.938 inches (2.38 cm) and the outer bearing diameter 562 is about 1.600 inches (4.06 cm). The length 564 of the first protuberances 520*a* is about 0.250 inches (0.635 cm), and typically falls in the range 0.245 to 0.255 inches (0.622 to 0.648 cm). The length 566 of the second protuberances 520*b* is about 0.380 inches (0.965 cm), and typically falls in the range 0.375 to 0.385 inches (0.953 to 0.978 cm). The diameter of the outer circle along which the second protuberances 520*b* lie is about 1.535 inches (3.899 cm); this diameter is called the "Protuberance Tangential Diameter" or "PTD." The radius 558 of the notches 550 is about 0.060 inches (0.152 cm).

Referring to FIG. 4B, the height 568 of the second protuberances 520*b* is in the range of about 0.025 to 0.035 inches (0.064 to 0.089 cm). The width 570 of the second protuberances 520*b* is about 0.080 inches (0.203 cm), and typically falls in the range of about 0.075 to 0.085 inches (0.191 to 0.216 cm).

Referring to FIG. 4C, the height 572 of the first protuberances 520*a* is in the range of about 0.045 to 0.055 inches (0.114 to 0.140 cm). The width 574 of the first protuberances 520*a* is about 0.055 inches (0.140 cm), and typically falls in the range of about 0.050 to 0.060 inches (0.127 to 0.152 cm). The outer diameter 576 of the DTI 500 is about 1.730 inches (4.394 cm), and typically falls in the range of about 1.720 to 1.750 inches (4.369 to 4.445 cm).

Referring to FIG. 4D, the height 578 of the DTI washer 500 is a minimum of about 0.158 inches (0.401 cm) and the distance 580 from the second face 516 to the top of the first protuberances 520*a* is a maximum of about 0.260 inches (0.660 cm). Finally, referring to FIG. 4E, the distance 582 by which the first protuberances 520*a* are offset from their respective indentations (i.e., the off-center extrusion distance) is about 0.030 inches (0.076 cm).

Figure 5:
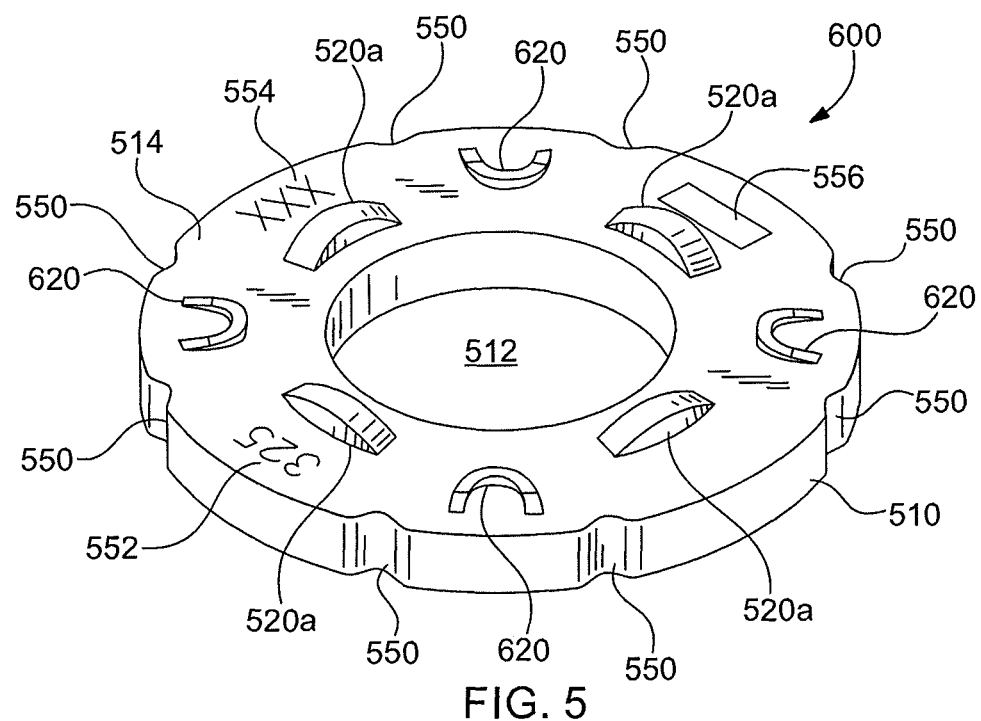
FIG. 5 illustrates, in a perspective view, an alternative embodiment of a two-stage DTI washer with horseshoe-shaped protuberances.

FIG. 5 illustrates, in a perspective view, an alternative embodiment of a two-stage DTI washer 600 with two sets of protuberances having more than one standard height. The DTI washer 600 is similar to the DTI washer 500, except that the second ring of shorter second protuberances 520*b* are replaced by a second ring of shorter U-shaped or "horseshoe" shaped protuberances 620. The first protuberances 520*a* flatten during the snugging or initial tightening operation and, like the second protuberances 520*b*, the horseshoe protuberances 620 flatten or crush when the minimum specified final bolt tension has been achieved. The primary function of the horseshoe protuberances 620 is not strength; rather, as described below, the primary function of the horseshoe protuberances 620 is to contain and control the flow of an indicating material 690.

As noted, the DTI washer 600 is similar to the DTI washer 500. The DTI washer 600 includes an annular body 510 surrounding a central hole 512. The first protuberances 520*a* and the horseshoe protuberances 620 are integral with the annular body 510. The first protuberances 520*a* and the horseshoe protuberances 620 are struck from and sheared from the annular body 510 to project from a first face 514 of the annular body 510 and leave a corresponding plurality of indentations in a second face 516 of the annular body 510 opposite from the first face 514. By integral, it is meant that the annular body 510 and the protuberances 520*a* and 620 are made of a single piece or a single unitary part without additional pieces.

Figure 5A:
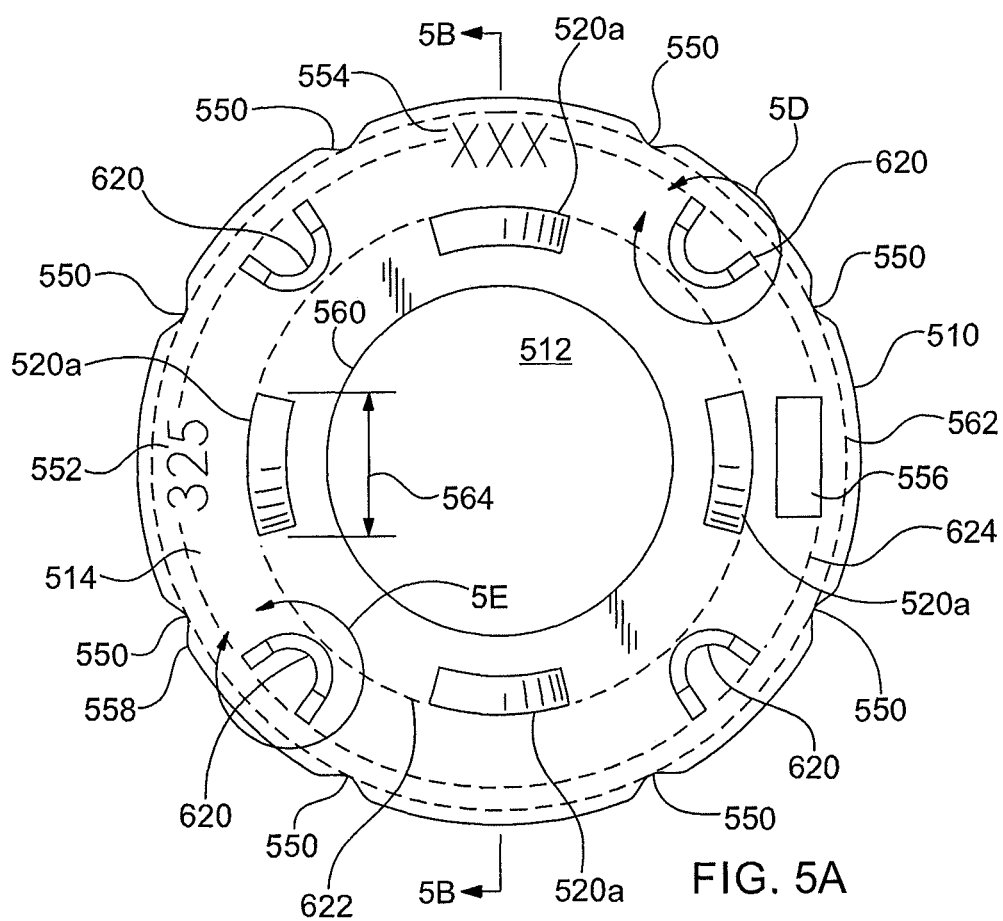
FIG. 5A is a top view of the DTI washer shown in FIG. 5.

The protuberances 520*a* and 620 (and their respective indentations) are spaced at regular intervals along respective imaginary circles around the central hole 512. Preferably, although not necessarily, the first set of first protuberances 520*a* are located closer to the central hole 512 and the horseshoe protuberances 620 are located farther from the central hole 512. As illustrated in FIG. 5A, which is a top view of the DTI washer 600 shown in FIG. 5, the first set of first protuberances 520*a* are spaced at regular intervals along the imaginary circle 622 and the horseshoe protuberances 620 are spaced at regular intervals along the imaginary circle 624. There is no limit on the number of protuberances 520*a* and 620 (and corresponding indentations) that may be included in the DTI washer 600.

FIG. 5 also illustrates that the DTI washer 600 has a series of notches 550 formed around the circumference of the annular body 510. The notches 550 function to distinguish the DTI washer 600 from conventional washers and to provide a location for an operator to place a tool such as a feeler gauge. Although eight notches 550 are shown in FIG. 5, any number of notches 550 suitable to achieve these functions could be provided.

The DTI washer 600 also may have, typically but not necessarily on its first face 514, a number of different indicia. For example, a first indicia 552 may indicate the type of the DTI washer 600, a second indicia 554 may indicate the lot number for the DTI washer 600, and a third indicia 556 may be the logo or other information indicating the source (i.e., manufacturer or distributor) of the DTI washer 600. Such indicia 552, 554, and 556 may be useful to the operator, among others.

Figure 5B:
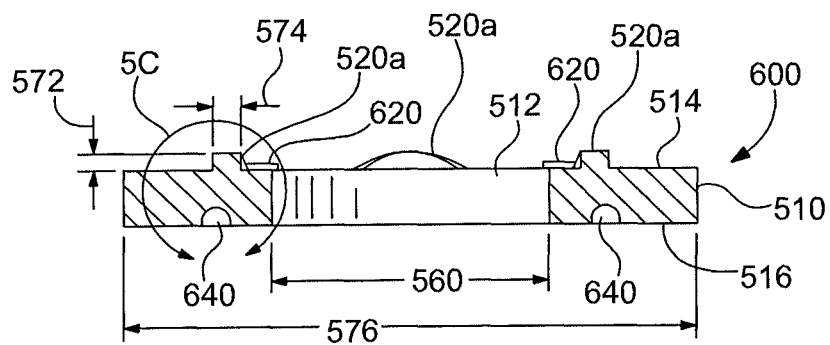
FIG. 5B is a cross-sectional view of the DTI washer taken along the line 5B-5B of FIG. 5A.
Figure 5C:
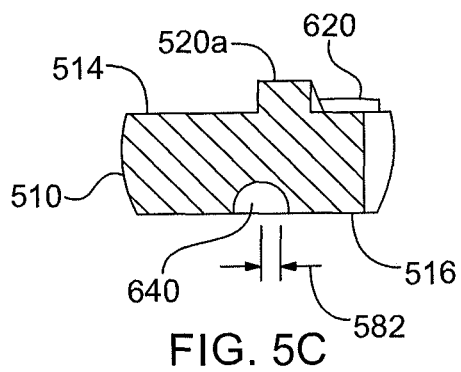
FIG. 5C is a detail view highlighted by the circle 5C of FIG. 5B.
Figure 5D:
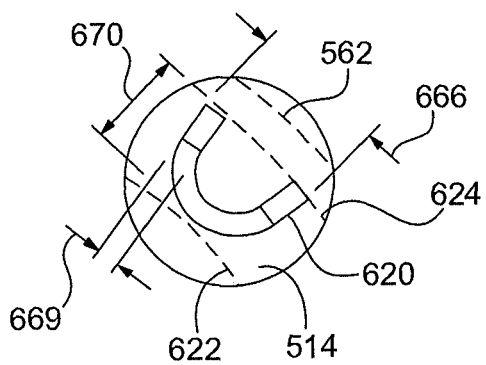
FIG. 5D is a detail view highlighted by the circle 5D of FIG. 5A.
Figure 5E:
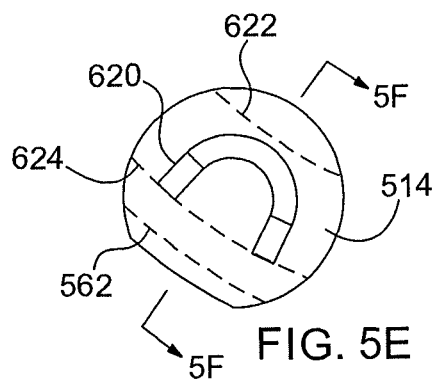
FIG. 5E is a detail view highlighted by the circle 5E of FIG. 5A.
Figure 5F:
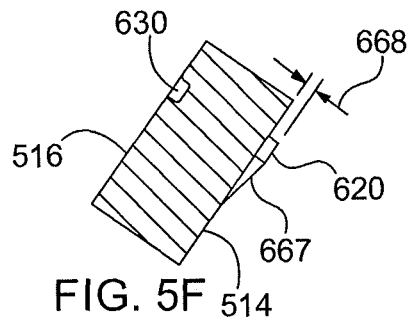
FIG. 5F is a cross-sectional view of the horseshoe protuberance of the DTI washer taken along the line 5F-5F of FIG. 5E.
Figure 5G:
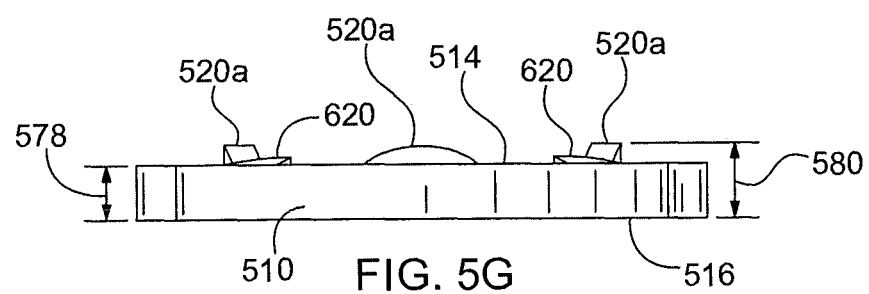
FIG. 5G is an edge view of the DTI washer shown in FIG. 5A.

FIG. 5B is a cross-sectional view of the DTI washer 600 taken along the line 5B-5B of FIG. 5A. FIG. 5C is the detail view highlighted by the circle 5C of FIG. 5B. FIG. 5D is the detail view highlighted by the circle 5D of FIG. 5A. FIG. 5E is the detail view highlighted by the circle 5E of FIG. 5A. FIG. 5F is a cross-sectional view of the horseshoe protuberance 620 of the DTI washer 600 taken along the line 5F-5F of FIG. 5E. And FIG. 5G is an edge view of the DTI washer 600 shown in FIG. 5A.

The following example dimensions are included to more clearly demonstrate the overall nature of the DTI washer 600. These example dimensions are exemplary, not restrictive, of the DTI washer 600. Referring to FIG. 5A, for a ¾ inch (1.91 cm) DTI washer 600 of type 325 ksi, the inner diameter 560 is about 0.813 inches (2.07 cm) and the outer bearing diameter 562 is about 1.555 inches (3.95 cm). The length 564 of the first protuberances 520a is about 0.315 inches (0.800 cm), and typically falls in the range 0.310 to 0.320 inches (0.787 to 0.813 cm). The diameter of the imaginary circle 622 along which the first protuberances 520a lie is about 1.125 inches (2.858 cm); this diameter is called the "Protuberance Tangential Diameter" or "PTD." The diameter of the imaginary circle 624 along which the horseshoe protuberances 620 lie is about 1.441 inches (3.660 cm). The radius 558 of the notches 550 is about 0.060 inches (0.152 cm).

Referring to FIG. 5B, the height 572 of the first protuberances 520a is in the range of about 0.045 to 0.055 inches (0.114 to 0.140 cm). The width 574 of the first protuberances 520a is about 0.080±0.002 inches (0.203±0.005 cm). The outer diameter 576 of the DTI 600 is about 1.615 inches (4.102 cm), and typically falls in the range of about 1.605 to 1.625 inches (4.077 to 4.128 cm). Also illustrated in FIG. 5B are the indentations 640 in the second face 516 that correspond to the first protuberances 520a. Referring to FIG. 5C, the distance 582 by which the first protuberances 520a are offset from their respective indentations 640 is about 0.030 inches (0.076 cm).

Referring to FIG. 5D, the length 666 of the horseshoe protuberances 620 is about 0.210 inches (0.533 cm). The width 670 of the horseshoe protuberances 620 is about 0.150 inches (0.381 cm). The thickness 669 of the walls of the horseshoe protuberances 620 is about 0.035 inches (0.089 cm). Referring to FIG. 5F, the maximum height 668 of the horseshoe protuberances 620 is about 0.040 inches (0.102 cm) at the apex of the horseshoe protuberances 620 located closest to the central hole 512. The height of the horseshoe protuberances 620 decreases gradually as a taper 667 along the width 670 of the horseshoe protuberances 620 until the height is zero where the horseshoe protuberances 620 meet the first face 514 at the imaginary circle 624. Also shown in FIG. 5F are the indentations 630 corresponding to the horseshoe protuberances 620. Note that, as shown in FIG. 5F, there is no offset between the indentations 630 and the horseshoe protuberances 620.

Finally, referring to FIG. 5G, the height 578 of the DTI washer 600 is a minimum of about 0.158 inches (0.401 cm) and a maximum of about 0.169 inches (0.429 cm). The distance 580 from the second face 516 to the top of the first protuberances 520a is a maximum of about 0.208 inches (0.528 cm).

Figure 6:
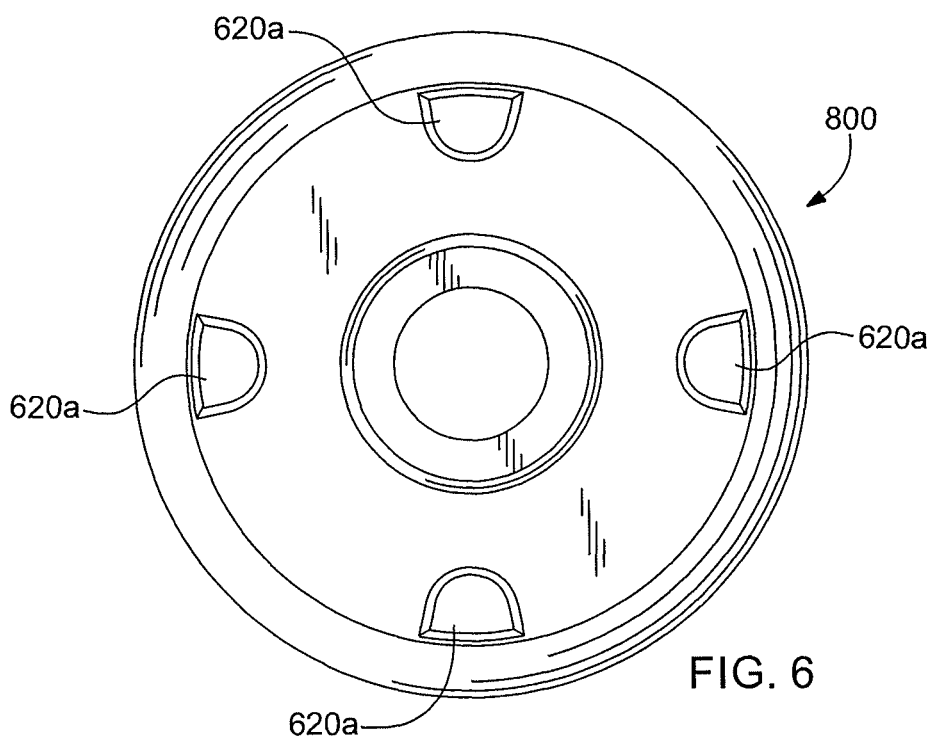
FIG. 6 illustrates a punch used to form the horseshoe protuberances in the annular body of the DTI washer shown in FIG. 5.

The DTI washers 500, 600 are manufactured using a tool (such as a punch) and die. The tool and die are used to stamp the various protuberances and indentations into a blank washer. FIG. 6 illustrates a punch 800 used to form the horseshoe protuberances 620 in the annular body 510 of the DTI washer 600. The punch 800 has "shovel"-shaped portions 620a, each of which forms an individual horseshoe protuberance 620. Although a punch having U-shaped portions could be used to form the horseshoe protuberances 620, testing proved that such a punch is not as durable as the punch 800 having shovel-shaped portions 620a. The more blunt shovel-shaped portions 620a improve tool life and are superior in forming the horseshoe protuberances 620 on the die side of the forming operation. Other processes, such as metal machining or metal casting, may be used to form the DTI washers 500, 600. In all cases, the metal product will be heat-treated by quenching and tempering after forming to produce the required spring-like load and deformation properties.

Figure 7:
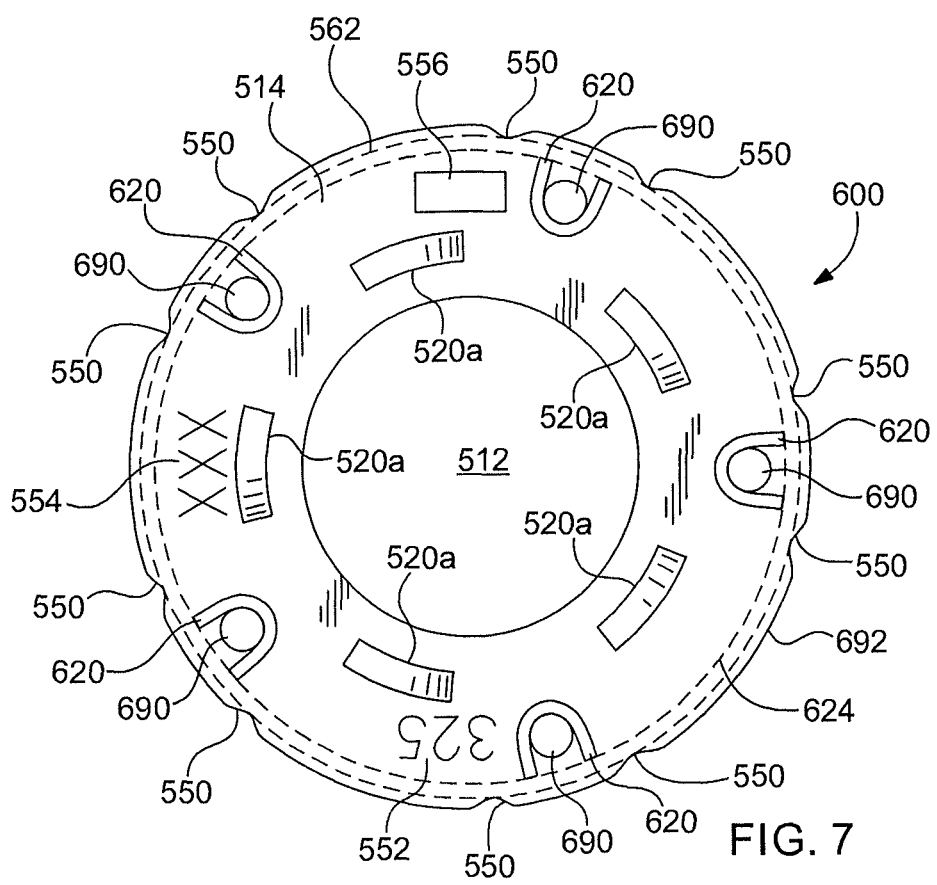
FIG. 7 illustrates indicating material captured within the horseshoe protuberances of the DTI washer shown in FIG. 5.

As illustrated in FIG. 7, an important function of the horseshoe protuberances 620 is to capture the indicating material 690. The horseshoe protuberances 620 must be located on the first face 514 of the DTI washer 600 proximate the outer edge 692 of the DTI washer 600, and along the imaginary circle 624, to ensure that the indicating material 690 is visible when a flat washer 140 is placed on the DTI washer 600. The location of the horseshoe protuberances 620 could be adjusted but must be as close to the outer edge 692 as possible while still providing a flat surface on which the indicating material 690 will appear when the bolt 120 is tightened. The indicating material 690 is an extrudable, elastomeric solid material such as silicone, and may be colored to improve visibility and provide additional information to the operator.

A number of shapes and dimensions were investigated for the horseshoe protuberances 620. Among the shapes were a variation on the continuous-ring type of protuberances depicted in U.S. Pat. No. 9,863,457; a V-shape; and an open-ended circle or C-shaped protuberance. Investigation revealed that the "U-shaped" horseshoe protuberances 620 provided the most reliable shape for containing the indicating material 690, and were also capable of being formed without excessive tool wear or breakage. Further, providing the taper 667 on the horseshoe protuberances 620 directed toward the outer edge 692 of the DTI washer 600 assures both (i) an excellent delineation between the snug and final tension points, and (ii) the benefit of directing the indicating material 690 towards the outer edge 692 where the indicating material 690 gives the operator visual information. The indicating material 690 provides a clear visual indication that a predetermined tension has been achieved in the fastener. By "predetermined" is meant determined beforehand, so that the predetermined characteristic (in this case, tension in the fastener or force upon the DTI washer 600)

must be determined, i.e., chosen or at least known, in advance of some event (in this case, tightening of the fastener).

Prototype testing has confirmed that application, retention, and directed flow of the indicating material 690 is enhanced by the shape of the horseshoe protuberances 620. As illustrated in FIG. 7, the indicating material 690 is deposited in the horseshoe protuberances 620, where the indicating material 690 is protected by the walls of the horseshoe protuberances 620. Upon flattening of the horseshoe protuberances 620, the indicating material 690 is forced towards the open ends of the horseshoe protuberances 620—which results in a visual indication of preload as the indicating material 690 emits beyond the outside diameter of the standard flat washer 140 that is placed over the DTI washer 600 as part of the joint assembly 100. The taper 667 of the horseshoe protuberances 620 (i) helps to force the indicating material 690 to the outer edge 692, and (ii) enhances the accuracy, predictability, consistency, and precision of how the indicating material 690 emits close to the required bolt tension.

Although the horseshoe protuberances 620 have the taper 667 in one embodiment, they do not have the taper 667 in an alternative embodiment. The horseshoe protuberances 620 of the alternative embodiment have a uniform height. Protuberances 620 having no (or less) taper 667 maximize (or increase) the volume or amount of the indicating material 690 that is protected by the walls of the horseshoe protuberances 620. Thus, the amount of the taper 667 given to the horseshoe protuberances 620 ranges from zero to maximum depending upon the particular application.

Another characteristic of the DTI washer 600 illustrated in FIG. 7 is noteworthy. Five horseshoe protuberances 620 are shown, rather than the four shown in FIG. 5. This difference illustrates the point that any suitable number of horseshoe protuberances 620 are possible for the DTI washer 600. Similarly, although the horseshoe protuberances 620 (and the first protuberances 520a, for that matter) as illustrated have the same shape and dimensions, such uniformity is not required. Thus, the horseshoe protuberances 620 may have different shapes, dimensions, or both depending on the application in which the DTI washer 600 will be used.

Figure 8:
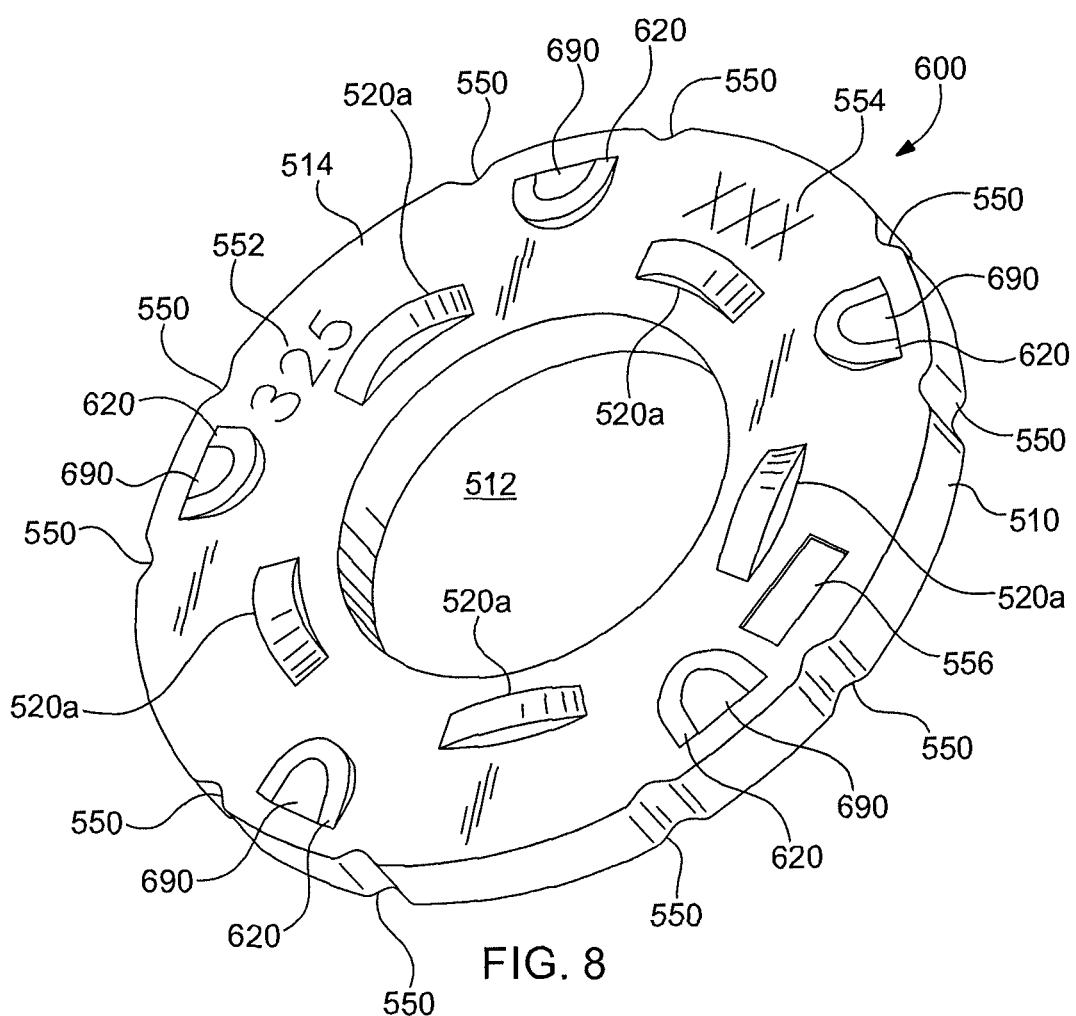
FIG. 8 illustrates the indicating material deposited entirely within the area defined by the horseshoe protuberances of the DTI washer shown in FIG. 5.

Like FIG. 7, FIG. 8 illustrates the indicating material 690 captured within the horseshoe protuberances 620 of the DTI washer 600. FIG. 7 illustrates the indicating material 690 deposited partially within the area on the first face 514 defined by the horseshoe protuberances 620. In contrast, FIG. 8 illustrates the indicating material 690 deposited entirely within the area on the first face 514 defined by the horseshoe protuberances 620. The shape of the indicating material 690 may entirely parallel the shape of the horseshoe protuberances 620, including height, width, and length.

FIG. 9A is a top view of another alternative embodiment of a DTI washer 700 with only one set of protuberances, namely horseshoe protuberances 620. The DTI washer 700 is similar to the DTI washer 600, except that the first ring of first protuberances 520a is eliminated leaving only the second ring of horseshoe protuberances 620. Again, the primary function of the horseshoe protuberances 620 is not strength; rather, the primary function of the horseshoe protuberances 620 is to contain and control the flow of the indicating material 690.

The first protuberances 520a are eliminated for the DTI washer 700 because they are not needed in certain applications. The DTI washer 700 is used only for snug-tightened joints that do not require full tensioning. Compared with the first protuberances 520a, the small, short, and not particularly strong horseshoe protuberances 620 provide some resistance to flattening. The horseshoe protuberances 620 collapse comparatively easily, however, and thereby emit the indicating material 690 under a load significantly less than a fully tightened bolt would require. The comparatively easy emission of the indicating material 690 is perfect for snug-tight bolts because such bolts are not required to have significant tension on them. In fact, the amount of tension is not specified in any code or standard. It will certainly take some force to flatten the horseshoe protuberances 620 and emit the indicating material 690. Whatever the amount of that force, however, the force will undoubtedly be enough to exceed requirements for snug tightening because snug tightening is defined as tension sufficient to preclude removal of the nut by hand. More important, the operator will be able to verify the snug condition visually for the first time.

FIG. 9B is the detail view highlighted by the circle 9B of FIG. 9A. FIG. 9C is a cross-sectional view of the horseshoe protuberance 620 of the DTI washer 700 taken along the line 9C-9C of FIG. 9B. FIG. 9D is a cross-sectional view of the DTI washer 700 taken along the line 9D-9D of FIG. 9A. And FIG. 9E is an edge view of the DTI washer 700 shown in FIG. 9A.

The following example dimensions are included to more clearly demonstrate the overall nature of the DTI washer 700. These example dimensions are exemplary, not restrictive, of the DTI washer 700. Referring to FIG. 9A, for a ¾ inch (1.91 cm) DTI washer 700 of type "SnugR," the inner diameter 560 is about 0.813 inches (2.07 cm) and the outer bearing diameter 562 is about 1.555 inches (3.95 cm). The diameter of the imaginary circle 624 along which the horseshoe protuberances 620 lie is about 1.441 inches (3.660 cm). The radius 558 of the notches 550 is about 0.060 inches (0.152 cm).

Referring to FIG. 9C, the maximum height 668 of the horseshoe protuberances 620 is about 0.040 inches (0.102 cm) at the apex of the horseshoe protuberances 620 located closest to the central hole 512. The height of the horseshoe protuberances 620 decreases gradually as a taper 667 along the width 670 of the horseshoe protuberances 620 until the height is zero where the horseshoe protuberances 620 meet the first face 514 at the imaginary circle 624. Also shown in FIG. 9C are the indentations 630 corresponding to the horseshoe protuberances 620. Note that, as shown in FIG. 9C, there is no offset between the indentations 630 and the horseshoe protuberances 620.

Referring to FIG. 9D, the outer diameter 576 of the DTI washer 700 is about 1.615 inches (4.102 cm), and typically falls in the range of about 1.605 to 1.625 inches (4.077 to 4.128 cm). Finally, referring to FIG. 9E, the height 578 of the DTI washer 700 is a minimum of about 0.126 inches (0.320 cm).

The DTI washers 500, 600, 700 are typically made of carbon and alloy steel per ASTM F 2437-06. Carbon steels contain carbon as the main alloying element. They are designated by AISI four-digit numbers, and contain 0.4% of silicon and 1.2% of manganese. Molybdenum, chromium, nickel, copper, and aluminum are present in small quantities. Impurities such as sulfur and phosphorous are also found in these steels. AISI 1040 and AISI 1050 carbon steels have high carbon content and can be hardened by heat treatment followed by quenching and tempering to achieve 150 to 250 ksi tensile strength. Although carbon steel is preferred, the DTI washers 500, 600, 700 can be made of stainless steel, nonferrous materials, and other alloy materials.

Figure 2A:
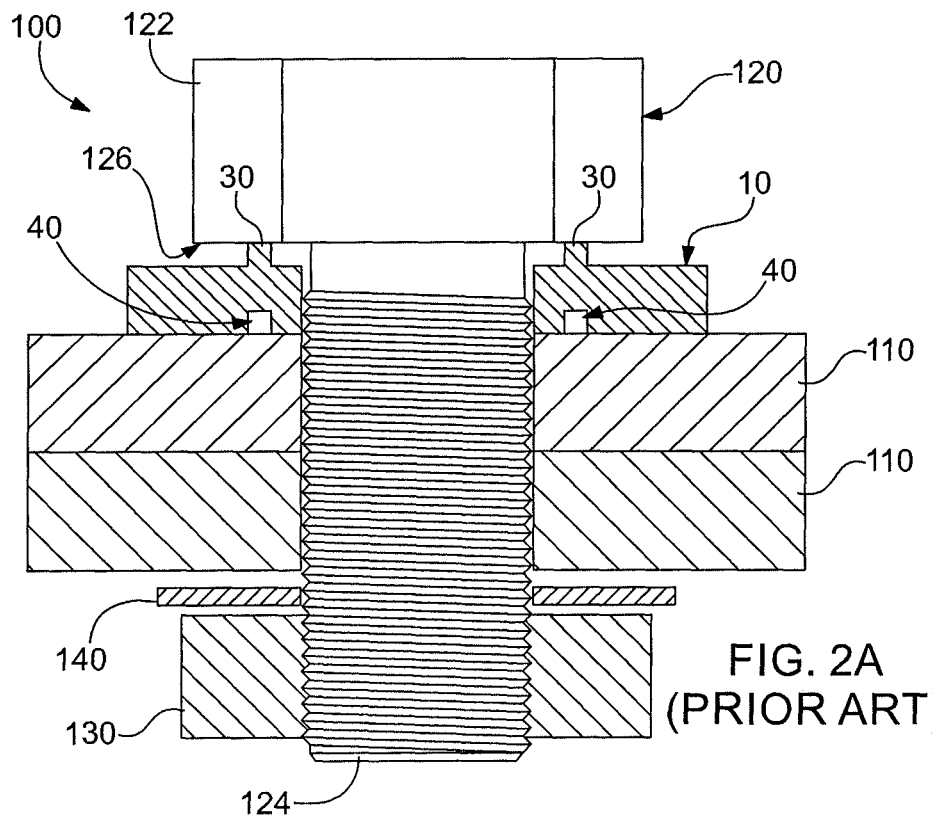
FIG. 2A is a side view of a joint assembly including the prior art DTI washer of FIG. 1A.
Figure 2B:
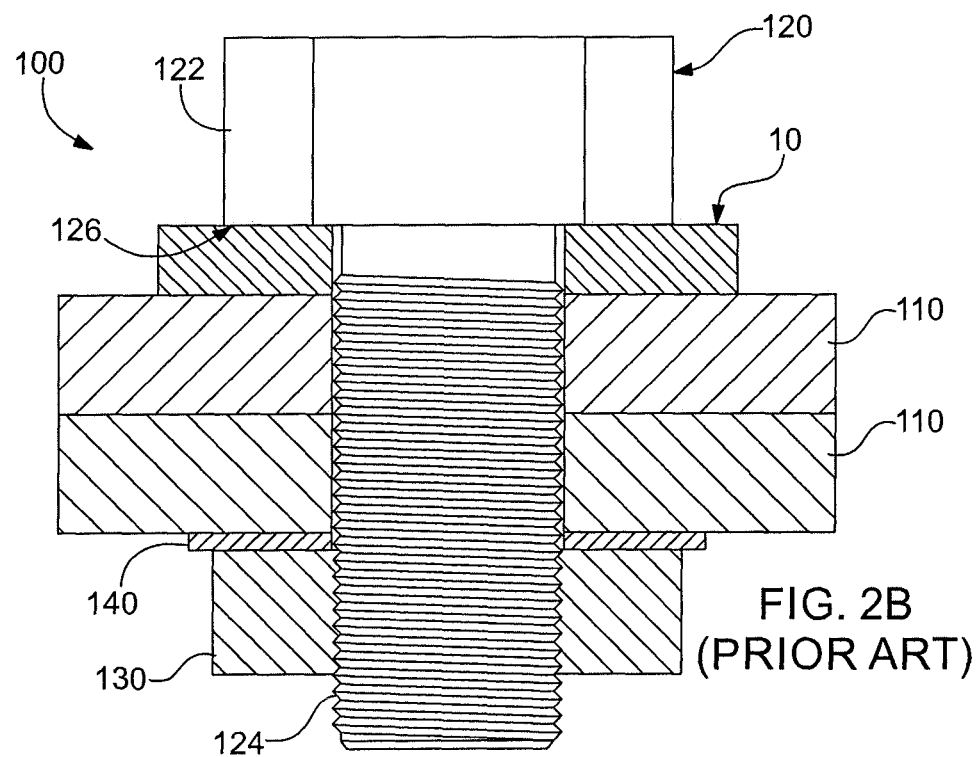
FIG. 2B is a side view of the joint assembly of FIG. 2A after the joint assembly has been tightened to collapse the protuberances of the prior art DTI washer.
Figure 10:
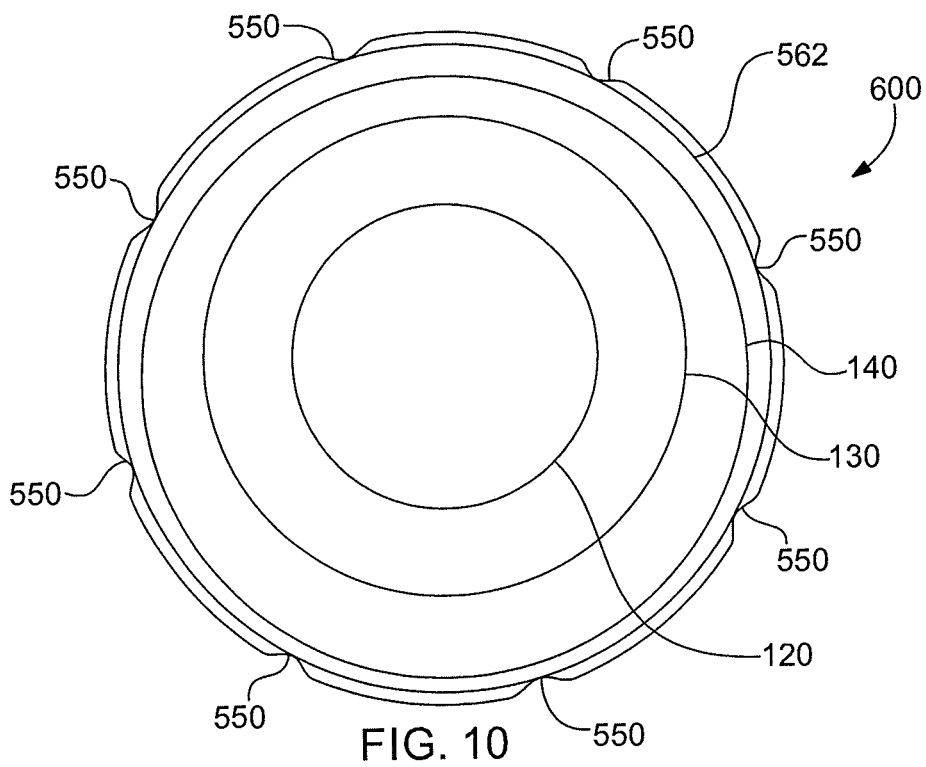
FIG. 10 shows the stack of components used to join two or more joint members in an exemplary joint assembly using one of the embodiments of the DTI washer illustrated in FIGS. 4, 5, and 9A.

The use of the DTI washer 500, 600, 700 constructed in accordance with the embodiments described above is illustrated in FIG. 10 with reference to FIGS. 2A and 2B. FIG. 10 shows the stack of components used to join two or more joint members 110 in an exemplary joint assembly 100. The nut 130, the conventional flat washer 140, and the DTI washer 500, 600, 700 all surround the bolt 120.

Figure 11:
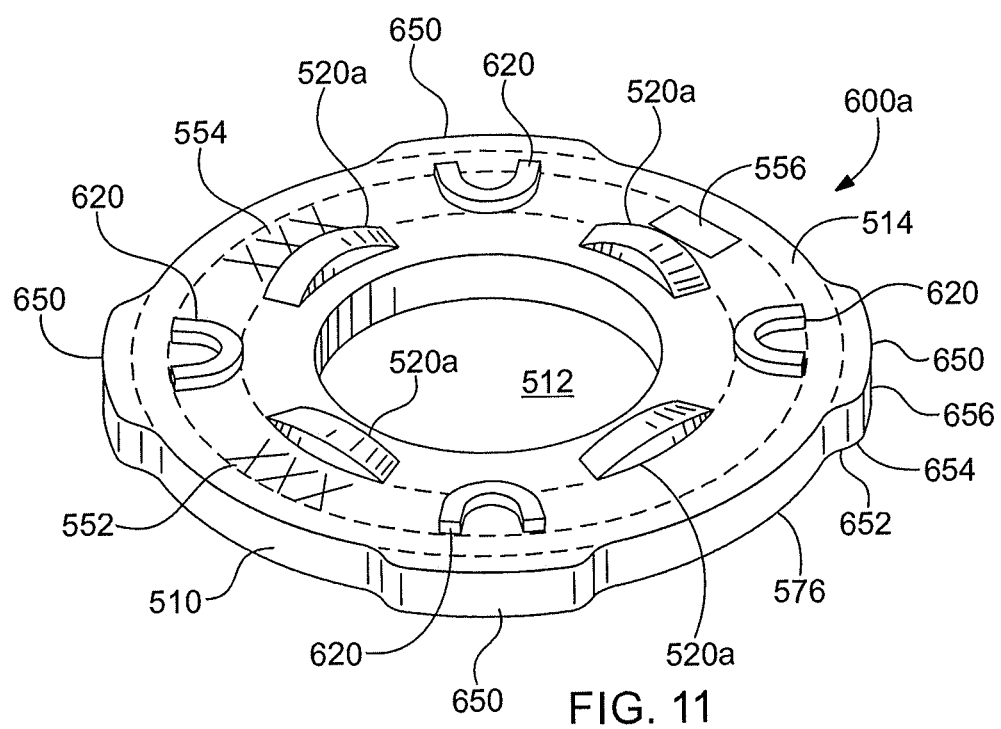
FIG. 11 illustrates, in a perspective view, an alternative embodiment of a two-stage DTI washer with horseshoe-shaped protuberances and a plurality of lobes.

FIG. 11 illustrates, in a perspective view, an alternative embodiment of a two-stage DTI washer 600a with two sets of protuberances having more than one standard height. The DTI washer 600a is similar to the DTI washer 600, except that (i) the DTI washer 600a does not have any notches 550, and (ii) the DTI washer 600a adds a plurality of lobes 650. Although another number of lobes 650 would be suitable, an exemplary four lobes 650 are illustrated. And, although other configurations would be suitable, the four lobes 650 are disposed symmetrically on either side of a central axis A such that the central points of the lobes 650 are separated by ninety degrees. Each lobe 650 has an inner radius 652 between the outer diameter 576 of the DTI washer 600a and the lobe 650, a periphery 656, and an outer radius 654 between the inner radius 652 and the periphery 656.

Figure 11A:
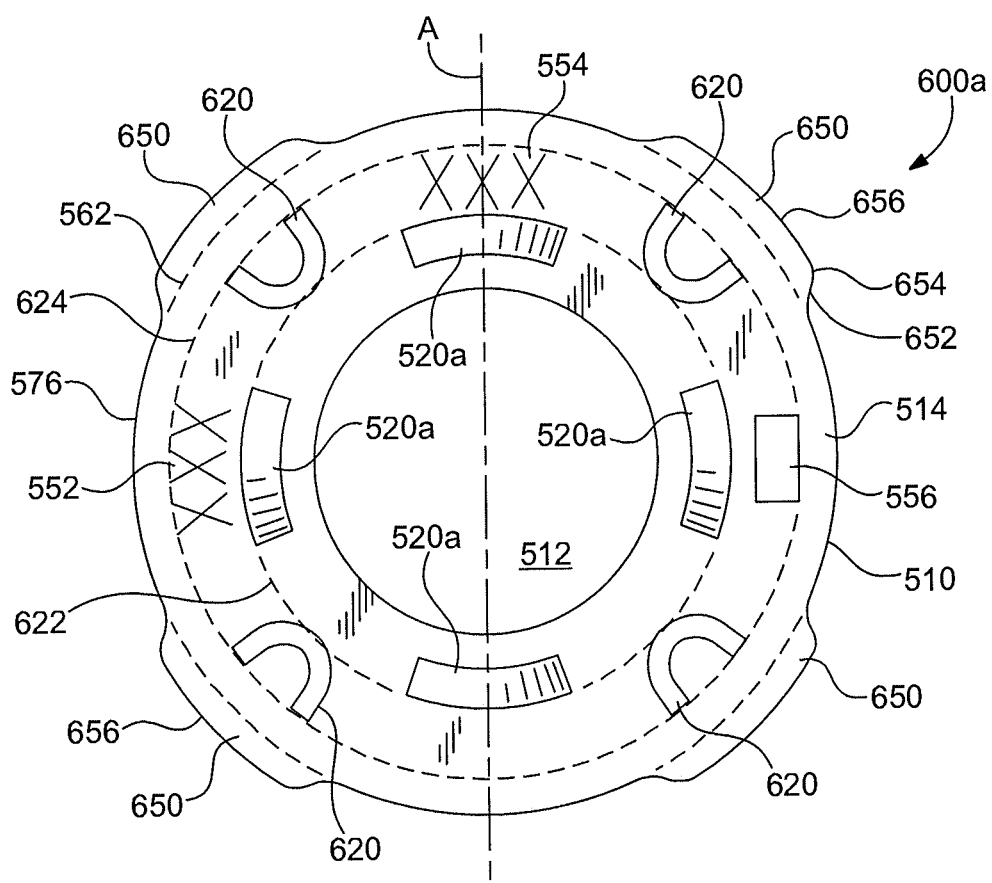
FIG. 11A is a top view of the DTI washer shown in FIG. 11.

As illustrated in FIG. 11A, which is a top view of the DTI washer 600a shown in FIG. 11, and like the DTI washer 600, the DTI washer 600a includes the first set of first protuberances 520a spaced at regular intervals along the imaginary circle 622 and the horseshoe protuberances 620 spaced at regular intervals along the imaginary circle 624. The indentations (not shown) corresponding to the first protuberances 520a and the second protuberances 520b could be sized and shaped according to any embodiment disclosed.

The lobes 650 address the need identified by the applicant to increase the distance between the shovel-shaped portions 620a of the punch 800 that form the horseshoe protuberances 620 and the outer diameter 576 of the DTI washer 600a. The location of the horseshoe protuberances 620 on the DTI washer 600a is constrained because the horseshoe protuberances 620 need to (i) fit properly under and be covered by the standard hardened washer 140 where they can be deformed, but (ii) allow the user to view the indicating material 690 as the indicating material 690 is pushed out of the horseshoe protuberances 620. Thus, as stated above, the location of the horseshoe protuberances 620 could be adjusted but must be as close to the outer edge 692 of the DTI washer 600a as possible while still providing a flat surface on which the indicating material 690 will appear when the bolt 120 is tightened. Such an acceptable location of the horseshoe protuberances 620 is too close to the outer diameter 576 of the DTI washer 600a, however, for easy forming and especially manipulation using the punch 800. Specifically, the small distance weakens the punch 800 because the shovel-shaped portions 620a are too close to the outer edge of the punch when the corresponding horseshoe protuberances 620 are close to the outer edge 692 of the DTI washer 600a. This disadvantage is exacerbated when wall heights of the horseshoe protuberances 620 must be adjusted during formation. Nor is it desirable, on the other hand, to increase the entire outer diameter 576 of the DTI washer 600a.

As reflected in the DTI washer 600a, the lobes 650 provide a solution to the identified disadvantage by increasing the amount of material surrounding the horseshoe protuberances 620. Such increase is accomplished by extending the annular body 510 beyond the outer edge 692 in the area proximate the horseshoe protuberances 620. The lobes 650 help reduce the volume of the raw material stock needed, because some of the material used to form the lobes 650 can be found within the circumferential spacings around where the outer diameter 576 of the DTI washer 600a is stamped. The lobes 650 also improve the effectiveness of the DTI washer 600a, because the lobes 650 create a "platform" or a "deck" upon which the indicating material 690 can flow. Thus, the lobes 650 improve the visibility of the indicating material 690 when it extrudes and is disposed on the flat, projecting surface of the lobes 650. The user or installer can more easily see that the tensioning of the bolt 120 has been completed.

The following example dimensions are included to more clearly demonstrate the overall nature of the DTI washer 600a. These example dimensions are exemplary, not restrictive, of the DTI washer 600a. Referring to FIG. 11A, for a ¾ inch (1.91 cm) DTI washer 600a of type 325 ksi, the inner diameter 560 is about 0.813 inches (2.07 cm) and the outer bearing diameter 562 is about 1.555 inches (3.95 cm). The length 564 of the first protuberances 520a is about 0.375 inches (0.953 cm), and typically falls in the range 0.370 to 0.380 inches (0.940 to 0.965 cm). The diameter of the imaginary circle 622 along which the first protuberances 520a lie is about 1.125 inches (2.858 cm); this diameter is called the "Protuberance Tangential Diameter" or "PTD." The diameter of the imaginary circle 624 along which the horseshoe protuberances 620 lie is about 1.441 inches (3.660 cm). The inner radius 652 of the lobes 650 is about 0.125 inches (0.318 cm), the outer radius 656 of the lobes 650 is about 0.063 inches (0.160 cm), and the periphery 656 of the lobes 650 defines a diameter of about 1.750 inches (4.445 cm).

The height 572 of the first protuberances 520a is in the range of about 0.035 to 0.055 inches (0.114 to 0.140 cm). The width 574 of the first protuberances 520a is about 0.090±0.002 inches (0.229±0.005 cm). The outer diameter 576 of the DTI 600 is about 1.620 inches (4.114 cm), and typically falls in the range of about 1.436 to 1.625 inches (3.647 to 4.128 cm). The distance 582 by which the first protuberances 520a are offset from their respective indentations 640 is about 0.025 inches (0.064 cm).

The length 666 of the horseshoe protuberances 620 is about 0.240 inches (0.609 cm). The width 670 of the horseshoe protuberances 620 is about 0.165 inches (0.419 cm). The thickness 669 of the walls of the horseshoe protuberances 620 is about 0.050 inches (0.127 cm). The maximum height 668 of the horseshoe protuberances 620 is about 0.040 inches (0.102 cm) at the apex of the horseshoe protuberances 620 located closest to the central hole 512. Finally, the height 578 of the DTI washer 600a is a minimum of about 0.126 inches (0.320 cm). The distance 580 from the second face 516 to the top of the first protuberances 520a is a maximum of about 0.240 inches (0.610 cm).

Referring to FIGS. 2A and 2B, the prior art DTI washer 10 may be replaced by any one of the DTI washers 500, 600, 600a, 700 and used to join two or more joint members 110 in the exemplary joint assembly 100. The DTI washer 500, 600, 600a, 700 is placed on a first side of the joint members 110. An externally threaded member, such as the bolt 120 having the head 122 and the threaded shank 124, is then inserted through the joint members 110 and the central hole 512 of the DTI washer 500, 600, 600a, 700 so that the bearing surface 126 of the bolt 120 contacts at least some of the protuberances of the DTI washer 500, 600, 600a, 700. Next, an internally threaded member, such as the nut 130, is attached to the shank 124 of the bolt 120 on a second side of the joint members 110 opposite the head 122 of the bolt 120. In some cases, the washer 140 may be positioned between the second side of the joint members 110 and the nut 130 to isolate the turning of the nut 130 from the joint members 110.

As the nut 130 is rotated and tightened onto the threaded shank 124 of the bolt 120, at least some of the protuberances of the DTI washer 500, 600, 600a, 700 are forced into their respective indentations. For the DTI washer 500, 600, and 600a, the first protuberances 520a disappear or are reduced to a desired distance which indicates the desired amount of snug tension in the threaded shank 124. For the DTI washer 700, the horseshoe protuberances 620 disappear or are reduced to a desired distance and the indicating material 690 is emitted at the interface between the washer 140 and the top or first face 514 of the DTI washer 700—both of which indicate achievement of the desired amount of snug tension in the threaded shank 124. The use of the DTI washer 700 is then complete, having fulfilled its function in a snug-tight application.

For the DTI washer 500, 600, 600a, however, tightening will continue beyond achievement of the snug-tight tension. As depicted in FIG. 2B, tightening is stopped once the gap between the head 122 of the bolt 120 and the DTI washer 500, 600, 600a disappears or is reduced to a desired distance which indicates the desired amount of final tension in the threaded shank 124. More specifically, tightening is stopped for the DTI washer 500 when the second protuberances 520b disappear or are reduced to a desired distance which indicates the desired amount of final tension in the threaded shank 124. Tightening is stopped for the DTI washer 600, 600a when the horseshoe protuberances 620 disappear or are reduced to a desired distance and the indicating material 690 is emitted at the interface between the washer 140 and the top or first face 514 of the DTI washer 600, 600a—both of which indicate achievement of the desired amount of final tension in the threaded shank 124.

The dimensions and material properties of the DTI washer 500, 600, 600a, 700 (and for the DTI washer 600, 600a, 700, the dimensions and material properties of the indicating material 690) determine how much tension is required to force the protuberances 520a, 520b, 620 back into their respective indentations 630, 640 (and for the DTI washer 600, 600a, 700, to emit the indicating material 690). The indentations 630, 640 may be at least partially filled as a result of the protuberances 520a, 520b, 620 being forced back into the annular body 510, and perform no useful function in the operation of the DTI washer 500, 600, 600a, 700. Rather, the indentations 630, 640 are a result of the displacement of material during the forming operation which creates the protuberances.

As depicted in FIGS. 2A and 2B, the joint assembly 100 includes one or more adjacent joint members, for example the first (or top) joint member 110 adjacent to a second (or bottom) joint member 110. It will be understood that "adjacent" as used in this document does not mean directly adjacent. In other words, one or more additional components may be disposed between the first joint member 110 and the second joint member 110, for example a third joint member, a space, etc. The joint assembly 100 further includes an aperture formed through the first joint member 110 and the second joint member 110. The aperture may be formed in the first joint member 110 and the second joint member 110 independently or simultaneously, and the aperture may have a uniform or non-uniform diameter. For example, the aperture may have a larger or smaller diameter in the first joint member 110 than in the second joint member 110. An embodiment of the DTI washer 500, 600, 600a, 700 described above is placed on the first joint member 110 with the second face 516 of the DTI washer 500, 600, 600a, 700 adjacent to a bearing surface of the first joint member 110. The bearing surface is the surface of the first joint member 110 opposite a second surface adjacent to the second joint member 110. The central hole 512 of the DTI washer 500, 600, 600a, 700 is aligned with the aperture. It will be understood that one or more washers, plates, or other elements may also be placed between the first joint member 110 and the DTI washer 500, 600, 600a, 700, but are not required.

As previously stated, the DTI washers 500, 600, 600a, 700 may include any number of protuberances 520a, 520b, 620 and indentations 630, 640, and the protuberances 520a, 520b, 620 and indentations 630, 640 may have any suitable shape and size. Typically, the protuberances 520a, 520b, 620 and their corresponding indentations 630, 640 will be of approximately equal shape and dimension. In other embodiments, the protuberances 520a, 520b, 620 may be smaller than their corresponding indentations 630, 640. In another exemplary embodiment, the DTI washer 500, 600, 600a, 700 includes protuberances 520a, 520b, 620 that are tapered such that the mass is concentrated along a central region between the outer sidewalls of the protuberances 520a, 520b, 620. The protuberances 520a, 520b, 620 and their corresponding indentations 630, 640 may be aligned, or offset, as desired for a particular application.

The DTI washers 500, 600, 600a, 700 offer new devices that make possible adaption of an existing device for uses never previously considered. The DTI washers 500, 600, 600a, 700 incorporate geometric forms beneficial or necessary to measure bolt tension more accurately than alternatives or existing art. The DTI washers 600, 600a, 700 enable encapsulation of the indicating material 690 and release of the indicating material 690 when a fastener is properly tightened, providing a visual and permanent indication that the joint assembly 100 has been properly tightened.

The processes of manufacturing the DTI washers 500, 600, 600a, 700 involve processes never previously used to manufacture DTI washers. The processes allow the DTI washers 500, 600, 600a, 700 to incorporate geometric forms that could not previously be manufactured. The methods of using the DTI washers 500, 600, 600a, 700 involve methods never previously used.

The various embodiments reflected in the DTI washers 500, 600, 600a, 700 offer many advantages over existing DTI washers. For example and as summarized above, the existing Squirter® DTI washer (disclosed in U.S. Pat. No. 5,931,618) has indicating material positioned in indentations and channels formed in the bottom or second surface (opposite the top or first surface from which the protuberances project). The channels lead from the indentations to the outside diameter of the DTI washer. The existing Squirter® DTI washer suffers from significant design flaws.

A primary problem with the design is that the indicating material is placed in the indentations on the bottom surface of the DTI and is channeled from the indentations to the outside diameter. The surface condition of the (typically steel) joint member 110 (or intervening component) upon which a DTI washer is placed during installation can range rather dramatically from a very smooth polished surface to a substantially coarse, rough, and uneven surface. Variability in the surface roughness of the joint member 110 (or intervening component) equates to variability in the point at which the indicating material emits from the DTI washer. This variability gives incorrect information to the operator, because the indicating material may emit way too early to be of much help in some applications, while in other applications the indicating material may not emit at all or may emit incompletely even on a bolt tightened just short of breaking.

In contrast, the DTI washers 600, 600a, 700 place the indicating material 690 on the first face 514 (i.e., the top) of the annular body 510 from which the horseshoe protuberances 620 extend. The first face 514 of the DTI washers 600, 600a, 700 is always placed against a smooth, hard, predictable surface; typically, the underside of the head 122 of a bolt 120 or a conventional washer 140. Therefore, location of the indicating material 690 on the first face 514 substantially improves the accuracy and repeatability of information provided to operators by the DTI washers 600, 600a, 700. No known DTI washer to date offers a feature on the top surface that could act as a "well" and hold or confine the indicating material for subsequent extrusion or emission once the DTI washer is placed under load and flattened.

Various shapes for the horseshoe protuberances 620 were considered. The specific shape of the horseshoe protuberances 620 was selected as an ideal balance between the strength and durability required of the tooling which produces the DTI washers 600, 600a, 700, while simultaneously directing and limiting the flow of the indicating material 690 in the most beneficial and controlled manner. The horseshoe protuberances 620 located on the first face 514 of the DTI washers 600, 600a, 700 are protuberances— similar to the protuberances that measure the bolt load. But the primary function of the horseshoe protuberances 620 is not strength; rather, the primary function of the horseshoe protuberances 620 is to contain the indicating material 690 and direct the indicating material 690 towards the outside diameter as a visual signal that the bolt has been tightened.

As noted above, another problem exists for conventional DTI washers. Existing DTI washers seek to ensure that fasteners have been adequately tightened upon final installation. There has been no device that focuses on first ensuring that a fastened joint has been snugged, or compacted properly into firm contact, before final tightening. The DTI washers 500, 600, 600a present a solution, however, to this limitation associated with existing DTI washers. The DTI washers 500, 600, 600a use protuberances 520a, 520b, 620 of different heights and strengths to allow a two-stage functionality. The first set of taller and weaker protuberances 520a noticeably deform and flatten upon the application of the comparatively small load necessary to snug a joint assembly 100 into firm contact. Thereafter, the second set of shorter and stronger protuberances 520b, 620 provide the additional strength necessary to allow the DTI washer 500, 600, 600a to indicate achievement of the minimum specified final preload before the full collapse of the protuberances 520b, 620.

The horseshoe protuberances 620 of the DTI washer 600, 600a work in conjunction with the taller first protuberances 520a. An important feature of the horseshoe protuberances 620 is that, although they are protuberances, they are not as tall as the (primary) first protuberances 520a which function to measure the bolt load. As the bolt load increases during tightening, the first protuberances 520a compress. During this stage of bolt tightening the horseshoe protuberances 620 do nothing because they are shorter and do not contact any other structure. Once bolt tightening has approached the point where the bolt 120 is nearing the target minimum specified tension, however, the first protuberances 520a have compressed sufficiently to allow contact of the horseshoe protuberances 620 with the flat hardened surface of the underside of the head 122 of the bolt 120 or the conventional washer 140. This contact and the shape of the horseshoe protuberances 620 results in the forced emission of the indicating material 690 towards the open side of the horseshoe. Thus, as bolt tightening approaches the final specified loads, only then does the indicating material 690 emit and indicate that bolt tightening has taken place.

One application for the DTI washers 500, 600, 600a is to overcome a limitation related to a structural bolting system introduced by the LeJeune Bolt Company and known as the "TNA Fastening System." The TNA Fastening System uses a two-stage tightening process, the first stage of which performs a snug tightening operation controlled by torque. The second stage performs a final tightening operation controlled by angle. See U.S. Patent Application Publication No. 2014/0048299 titled "Torque-Angle Structural Fastening System" filed by Chad M. Larson of the LeJeune Bolt Company.

In neither stage does the TNA Fastening System provide a visual indication that the operation has been completed. The DTI washers 500, 600, 600a address both snug and final tightening and provide clear visual and measurable reduction in the gap between the protuberances 520a, 520b, 620 and the head 122 of the bolt 120 in both the snug and final tightening stages. Thus, the DTI washers 500, 600, 600a can be used with the TNA Fastening System to enhance the operation of the TNA Fastening System. Specifically, the snug-tight visual indication of the DTI washers 500, 600, 600a is beneficial because it provides visual evidence that the first stage of tightening has been performed and the tightening tool of the TNA Fastening System can be switched over to the angle setting for final tightening. Further, upon the completion of the final tightening by the TNA Fastening System, the DTI washers 500, 600, 600a prove that the joint assembly 100 has been fully tightened.

In summary, one or more of the DTI washers 500, 600, 600a, 700 disclosed above offer some or all of the following enumerated advantages:

(1) The protuberances 520a, 520b, and 620 have differing heights, strengths, and shapes allowing them to perform different functions.

(2) The uniquely shaped horseshoe protuberances 620 encapsulate and direct accurately the indicating material 690.

(3) The horseshoe protuberances 620 emit the indicating material 690 just as the bolt 120 approaches proper tension, and not continuously and prematurely as in existing DTI washers.

(4) Each of the DTI washers 500, 600, 600a, 700 provides a clear visual indication of snug tightening.

(5) The DTI washers 500, 600, 600a provide a clear visual indication of final tension.

(6) The protuberances 520a, 520b, and 620 have geometric shapes and dimensions improving their function.

(7) Each of the DTI washers 500, 600, 600a, 700 exhibits durability in packing, shipment, and storage.

In further summary, one or more of the DTI washers 500, 600, 600a, 700 disclosed above have some or all of the following uses and applications. First, the DTI washers 500, 600, 600a, 700 provide visual proof that snug has been achieved. Second, the DTI washers 500, 600, 600a provide visual proof that snug has been achieved, and subsequently and separately that final tension has been achieved. Third, the DTI washers 500, 600, 600a, 700 can be used in combination with the TNA Fastening System. Fourth, the DTI washers 500, 600, 600a provide a clear visual cue that the DTI washer 500, 600, 600a has been adequately flattened and, therefore, the joint assembly 100 is properly and adequately tightened for full tightening applications. Finally, the DTI washer 700 can be used to provide a clear visual indication that snug has been achieved in joint assemblies 100 for which only snug tight is required.

In still further summary, one or more of the DTI washers 500, 600, 600*a*, 700 disclosed above achieve some or all of the following listed functions and purposes:

(a) enable a DTI washer to perform two or more discreet load measurements accurately;

(b) enable a DTI washer to perform two or more different operations as a function of the plastic deformation of the protuberances;

(c) use uniquely shaped and varying height protuberances to enable visual indication that the joint assembly 100 is adequately tightened;

(d) overcome the geometric limitations of standard DTI washers through protuberance shapes that protect the indicating material 690 during handling, packaging, shipping, and warehousing so that the indicating material 690 can visually indicate when adequate bolt tension has been achieved;

(e) overcome other limitations of the existing DTI washers;

(f) overcome the design flaws in conventional Squirter® DTI washers which suffer from the indicating material giving premature or otherwise inaccurate visual indications that a bolt is adequately tightened;

(g) through geometric design, delay the emission of the indicating material 690 until the joint assembly 100 is adequately tightened;

(h) capture the indicating material 690 so that during use the indicating material 690 is located against a relatively smooth surface (e.g., the washer 140 or the head 122 of the bolt 120) that ensures predictable, repeatable, and accurate results; and (i) provide visual proof that the snug-tight condition has been achieved in the joint assembly 100 and that the connection is in firm contact.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges. It is also expressly intended that the steps of the methods of using the various devices disclosed above are not restricted to any particular order.

What is claimed:

1. A direct tension indicating washer comprising:
    an annular body including a central hole, a circumference, an outer edge, a first face, and a second face opposite from the first face; and
    one or more U-shaped horseshoe protuberances having a height, an apex closest to the central hole, and an opening directed toward the outer edge, the horseshoe protuberances being integral with the annular body and struck and partially sheared from the annular body to project from the first face of the annular body and leave one or more corresponding indentations in the second face of the annular body.

2. The direct tension indicating washer of claim 1, wherein each of the one or more horseshoe protuberances are radially offset from the one or more corresponding indentations.

3. The direct tension indicating washer of claim 1, wherein each of the one or more horseshoe protuberances has a maximum height at its apex and gradually tapers from the apex to a zero height at the opening where the horseshoe protuberance meets the first face of the annular body.

4. The direct tension indicating washer of claim 1 further comprising an indicating material initially encapsulated and contained within the area on the first face defined by each of the one or more horseshoe protuberances, wherein the horseshoe protuberances release and direct the indicating material out of the openings in the horseshoe protuberances and towards the outer edge of the annular body when the horseshoe protuberances collapse under a predetermined force.

5. The direct tension indicating washer of claim 4, wherein the indicating material, as initially encapsulated and contained, completely covers the area on the first face defined by each of the one or more horseshoe protuberances.

6. The direct tension indicating washer of claim 4, wherein the indicating material is an extrudable elastomeric solid.

7. The direct tension indicating washer of claim 4, wherein each of the one or more horseshoe protuberances are located proximate the outer edge of the annular body.

8. The direct tension indicating washer of claim 4, wherein release of the indicating material is adapted to give an operator a visual signal that the predetermined force has been achieved.

9. The direct tension indicating washer of claim 8, wherein the predetermined force is adapted to correspond to a predetermined tension in a fastener engaged, directly or indirectly, by the direct tension indicating washer.

10. The direct tension indicating washer of claim 9, wherein the predetermined tension corresponds to snug tightening of the fastener.

11. The direct tension indicating washer of claim 1 further comprising one or more additional protuberances having a height greater than the height of the horseshoe protuberances, the additional protuberances being integral with the annular body and struck and partially sheared from the annular body to project from the first face of the annular body and leave one or more corresponding additional indentations in the second face of the annular body opposite from the first face.

12. The direct tension indicating washer of claim 1 further comprising notches disposed around the circumference of the annular body, the notches distinguishing the direct tension indicating washer from other washers and providing a location for an operator to place a tool.

13. The direct tension indicating washer of claim 1, wherein the one or more horseshoe protuberances are formed using a punch and die, the punch having one or more shovel-shaped portions, each of which forms an individual horseshoe protuberance.

14. The direct tension indicating washer of claim 1, wherein the annular body has a plurality of lobes that increase the amount of material surrounding the horseshoe protuberances by extending the annular body beyond the outer edge in the area proximate the horseshoe protuberances.

15. A joint assembly comprising:
    at least one joint member having an aperture;
    a direct tension indicating washer disposed adjacent to the at least one joint member, the direct tension indicating washer having:
        (a) an annular body including a central hole, aligned with the aperture of the at least one joint member, an outer edge, a first face, and a second face opposite from the first face, and (b) one or more U-shaped horseshoe protuberances having a height, an apex closest to the central hole, and an opening directed toward the outer edge, the horseshoe protuberances being integral with the annular body and struck and partially sheared from the annular body to project from the first face of the annular body and leave one or more corresponding indentations in the second face of the annular body;

a shaft in the aperture of the at least one joint member and the central hole of the annular body;

a first bearing member either attached to the shaft or loosely disposed around the shaft on a first side of the at least one joint member, wherein the first bearing member has a bearing surface in contact with the one or more protuberances of the direct tension indicating washer; and a second bearing member either attached to the shaft or loosely disposed around the shaft on a second side of the at least one joint member opposite the first side, wherein the second bearing member has a bearing surface in contact with the second side of the at least one joint member.

16. A direct tension indicating washer comprising:

an annular body including a central hole, a circumference, a first face, and a second face opposite from the first face;

a set of first protuberances having a first height and being integral with the annular body and struck and partially sheared from the annular body to project from the first face of the annular body and leave one or more corresponding first indentations in the second face of the annular body; and a set of second protuberances having a second height smaller than the first height and being integral with the annular body and struck and partially sheared from the annular body to project from the first face of the annular body and leave one or more corresponding second indentations in the second face of the annular body, wherein at least one of the first protuberances or the second protuberances are radially offset from their corresponding indentations.

17. The direct tension indicating washer of claim 16, wherein the first protuberances are located closer to the central hole and the second protuberances are located farther from the central hole.

18. The direct tension indicating washer of claim 16, wherein the first protuberances are adapted to indicate that snug tightening of a joint assembly has been achieved and the second protuberances are adapted to indicate that final tightening of the joint assembly has been achieved.

19. The direct tension indicating washer of claim 16 further comprising notches disposed around the circumference of the annular body, the notches distinguishing the direct tension indicating washer from other washers and providing a location for an operator to place a tool.

20. A joint assembly comprising:

at least one joint member having an aperture;

a direct tension indicating washer disposed adjacent to the at least one joint member, the direct tension indicating washer having:

(a) an annular body including a central hole, aligned with the aperture of the at least one joint member, a circumference, a first face, and a second face opposite from the first face, (b) a set of first protuberances having a first height and being integral with the annular body and struck and partially sheared from the annular body to project from the first face of the annular body and leave one or more corresponding first indentations in the second face of the annular body, and (c) a set of second protuberances having a second height smaller than the first height and being integral with the annular body and struck and partially sheared from the annular body to project from the first face of the annular body and leave one or more corresponding second indentations in the second face of the annular body, wherein at least one of the first protuberances or the second protuberances are radially offset from their corresponding indentations;

a shaft in the aperture of the at least one joint member and the central hole of the annular body;

a first bearing member either attached to the shaft or loosely disposed around the shaft on a first side of the at least one joint member, wherein the first bearing member has a bearing surface in contact with at least the first protuberances of the direct tension indicating washer; and a second bearing member either attached to the shaft or loosely disposed around the shaft on a second side of the at least one joint member opposite the first side, wherein the second bearing member has a bearing surface in contact with the second side of the at least one joint member.

* * * * *